(12) United States Patent
Keller et al.

(10) Patent No.: US 10,648,573 B2
(45) Date of Patent: May 12, 2020

(54) FLUIDIC SWITCHING DEVICES

(71) Applicant: Facebook Technologies, LLC, Menlo Park, CA (US)

(72) Inventors: Sean Jason Keller, Kirkland, WA (US); Jack Lindsay, Seattle, WA (US); Serol Turkyilmaz, Redmond, WA (US); John Michael Lutian, Bellevue, WA (US); Tristan Thomas Trutna, Seattle, WA (US); Andrew Arthur Stanley, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 40 days.

(21) Appl. No.: 15/683,937

(22) Filed: Aug. 23, 2017

(65) Prior Publication Data

US 2019/0063619 A1    Feb. 28, 2019

(51) Int. Cl.
| | | |
|---|---|---|
| G05D 7/03 | (2006.01) | |
| F16K 31/02 | (2006.01) | |
| F16K 3/28 | (2006.01) | |
| F16K 31/385 | (2006.01) | |
| F16K 3/34 | (2006.01) | |
| G06F 3/01 | (2006.01) | |

(52) U.S. Cl.
CPC ............ *F16K 3/28* (2013.01); *F16K 3/34* (2013.01); *F16K 31/02* (2013.01); *F16K 31/385* (2013.01); *G06F 3/014* (2013.01); *G06F 3/016* (2013.01)

(58) Field of Classification Search
CPC ........ F16K 3/28; F16K 31/02; F16K 99/0026; F16K 99/0015; F16K 99/0061; F15C 3/04

USPC .................................. 137/105; 251/5, 61.1
See application file for complete search history.

(56) References Cited

U.S. PATENT DOCUMENTS

| 844,410 A | 2/1907 | Schauer |
|---|---|---|
| 2,241,086 A | 5/1941 | Gould |
| (Continued) | | |

FOREIGN PATENT DOCUMENTS

| EP | 3351839 A2 | 7/2018 |
|---|---|---|
| KR | 10-2016-0098056 A | 8/2016 |
| (Continued) | | |

OTHER PUBLICATIONS

European Partial Search Report, European Application No. 18151564.4, dated Jul. 17, 2018, 17 pages.

(Continued)

*Primary Examiner* — Minh Q Le
(74) *Attorney, Agent, or Firm* — FisherBroyles, LLP

(57) ABSTRACT

A fluidic device controls fluid flow in channel from a source to a drain. In some embodiments, the fluidic devices comprises a gate, a channel, and an obstruction. The gate comprises at least one chamber whose volume increases with fluid pressure. A high pressure state of the gate corresponds to a first chamber size and a low pressure state of the gate corresponds to a second chamber size that is smaller than the first chamber size. The obstruction controls a rate of fluid flow within the channel based on the fluid pressure in the gate. The obstruction induces at most a first flow rate of fluid in the channel in accordance with the low pressure state of the gate, and at least a second flow rate of the fluid in the channel in accordance with the high pressure state of the gate.

20 Claims, 16 Drawing Sheets

(56) References Cited

U.S. PATENT DOCUMENTS

| | | | |
|---|---|---|---|
| 2,345,693 A | 4/1944 | Wilson et al. | |
| 2,590,215 A | 3/1952 | Sausa | |
| 2,633,154 A * | 3/1953 | Eastman | F16K 7/07 138/46 |
| 2,715,009 A | 8/1955 | Beekley | |
| 3,237,616 A * | 3/1966 | Daigh | F01M 13/023 123/574 |
| 3,441,245 A * | 4/1969 | Holland | F16K 7/07 251/5 |
| 3,468,342 A | 9/1969 | Craft | |
| 3,549,118 A | 12/1970 | Bluder | |
| 3,759,483 A * | 9/1973 | Baxter | F16K 7/06 251/251 |
| 3,936,028 A * | 2/1976 | Norton | F16K 7/07 251/5 |
| 3,951,168 A | 4/1976 | Roberts | |
| 4,322,054 A * | 3/1982 | Campbell | F16K 7/061 251/5 |
| 5,071,411 A * | 12/1991 | Hillstead | A61B 17/3462 251/341 |
| 5,078,363 A | 1/1992 | Gregory | |
| 5,354,162 A * | 10/1994 | Burdea | A61F 5/0118 414/4 |
| 5,441,231 A * | 8/1995 | Payne | F16K 7/066 251/5 |
| 6,406,605 B1 | 6/2002 | Moles | |
| 6,461,335 B1 * | 10/2002 | Noecker | A61M 5/14 251/349 |
| 6,474,623 B1 | 11/2002 | Davies | |
| 6,505,810 B2 * | 1/2003 | Abromaitis | F16K 7/04 251/4 |
| 7,138,976 B1 * | 11/2006 | Bouzit | G06F 3/014 345/156 |
| 7,703,477 B2 | 4/2010 | Cook et al. | |
| 8,286,933 B2 * | 10/2012 | Hanada | F16K 23/00 251/229 |
| 8,585,006 B2 * | 11/2013 | Gabelgaard | F16K 7/06 251/5 |
| 8,603,834 B2 * | 12/2013 | Puleo | B01L 3/50273 251/12 |
| 8,714,514 B2 * | 5/2014 | Eijkelenberg | F16K 7/07 251/29 |
| 8,922,355 B2 * | 12/2014 | Kusuura | G06F 3/00 340/407.1 |
| 2002/0158217 A1 * | 10/2002 | Inoue | F16K 7/06 251/5 |
| 2003/0010946 A1 * | 1/2003 | Furukawa | F16K 7/066 251/5 |
| 2003/0141470 A1 | 7/2003 | Igarashi | |
| 2003/0196695 A1 | 10/2003 | O'Connor et al. | |
| 2004/0033108 A1 * | 2/2004 | Raftis | E03F 7/02 405/37 |
| 2004/0056220 A1 * | 3/2004 | Raftis | F16K 7/17 251/5 |
| 2006/0058740 A1 * | 3/2006 | Cise | A61M 5/142 604/247 |
| 2006/0243934 A1 * | 11/2006 | Chung | F16K 31/002 251/11 |
| 2007/0170382 A1 * | 7/2007 | Li | F16K 7/06 251/5 |
| 2008/0087853 A1 * | 4/2008 | Kees | F16K 7/065 251/5 |
| 2008/0264863 A1 | 10/2008 | Quake et al. | |
| 2009/0007969 A1 * | 1/2009 | Gundel | F16K 99/0001 137/15.18 |
| 2009/0145502 A1 | 6/2009 | Dirac et al. | |
| 2009/0302244 A1 * | 12/2009 | Wedel | A61M 39/284 251/5 |
| 2010/0078584 A1 | 4/2010 | Van Den Bijgaart et al. | |
| 2010/0093559 A1 | 4/2010 | Fan et al. | |
| 2010/0170572 A1 | 7/2010 | Hemantkumar et al. | |
| 2010/0180970 A1 | 7/2010 | Welle | |
| 2010/0260617 A1 | 10/2010 | Haertl | |
| 2010/0266980 A1 | 10/2010 | Boyd et al. | |
| 2011/0045599 A1 | 2/2011 | Erickson et al. | |
| 2011/0254672 A1 * | 10/2011 | Ciesla | G06F 3/016 340/407.2 |
| 2012/0039770 A1 | 2/2012 | Namkoong et al. | |
| 2012/0275929 A1 | 11/2012 | Salsman | |
| 2014/0130920 A1 * | 5/2014 | Fernandes | B01L 3/502707 137/832 |
| 2014/0134001 A1 * | 5/2014 | Uchida | A61M 5/1422 417/53 |
| 2015/0267822 A1 | 9/2015 | Nissen | |
| 2016/0238040 A1 * | 8/2016 | Gallo | A61B 34/76 |
| 2017/0300115 A1 * | 10/2017 | Kerr | G06F 3/016 |
| 2018/0038513 A1 * | 2/2018 | Baldea | B01J 19/0093 |

FOREIGN PATENT DOCUMENTS

| | | |
|---|---|---|
| WO | WO 89/05417 A1 | 6/1989 |
| WO | WO 2010/104878 A1 | 9/2010 |
| WO | WO 2016/205143 A1 | 12/2016 |

OTHER PUBLICATIONS

Eddington, D. et al., "Flow Control with Hydrogels," Advanced Drug Delivery Reviews, Feb. 10, 2004, pp. 199-210, vol. 56, No. 2.

Frank, P. et al., "Integrated Microfluidic Membrane Transistor Utilizing Chemical Information for On-Chip Flow Control," PLOS One, Aug. 29, 2016, e0161024, 17 pages, vol. 11, No. 8.

Yu, Q. et al., "Responsive Biomimetic Hydrogel Valve for Microfluidics," Applied Physics Letters, Apr. 23, 2001, pp. 2589-2591, vol. 78, No. 17.

PCT International Search Report, PCT Application No. PCT/US2017/052048, dated May 23, 2018, 18 pages.

Devaraju, N.S.G.K. et al., "Pressure Driven Digital Logic in PDMS Based Microfluidic Devices Fabricated by Multilayer Soft Lithography," Lab Chip, The Royal Society of Chemistry, 2012, pp. 4809-4815, vol. 12.

European Partial Search Report, European Application No. 18158349.3, dated Sep. 20, 2018, 17 pages.

Mohan, R. et al., "Design Considerations for Elastomeric Normally Closed Microfluidic Valves," Sensors and Actuators B: Chemical: International Journal Devoted to Research and Development of Physical and Chemical Transducers, Sep. 17, 2011, pp. 1216-1223, vol. 160, No. 11.

Perdigones, F.A. et al., "Correspondence Between Electronics and Fluids in MEMS: Designing Microfluidic Systems Using Electronics," IEEE Industrial Electronics Magazine, Dec. 1, 2014, pp. 6-17, vol. 8, No. 4.

PCT International Search Report and Written Opinion, PCT Application No. PCT/US2017/064683, dated Mar. 30, 2018, 19 pages.

PCT International Search Report and Written Opinion, PCT Application No. PCT/US2018/046486, dated Jan. 8, 2019, 15 pages.

* cited by examiner

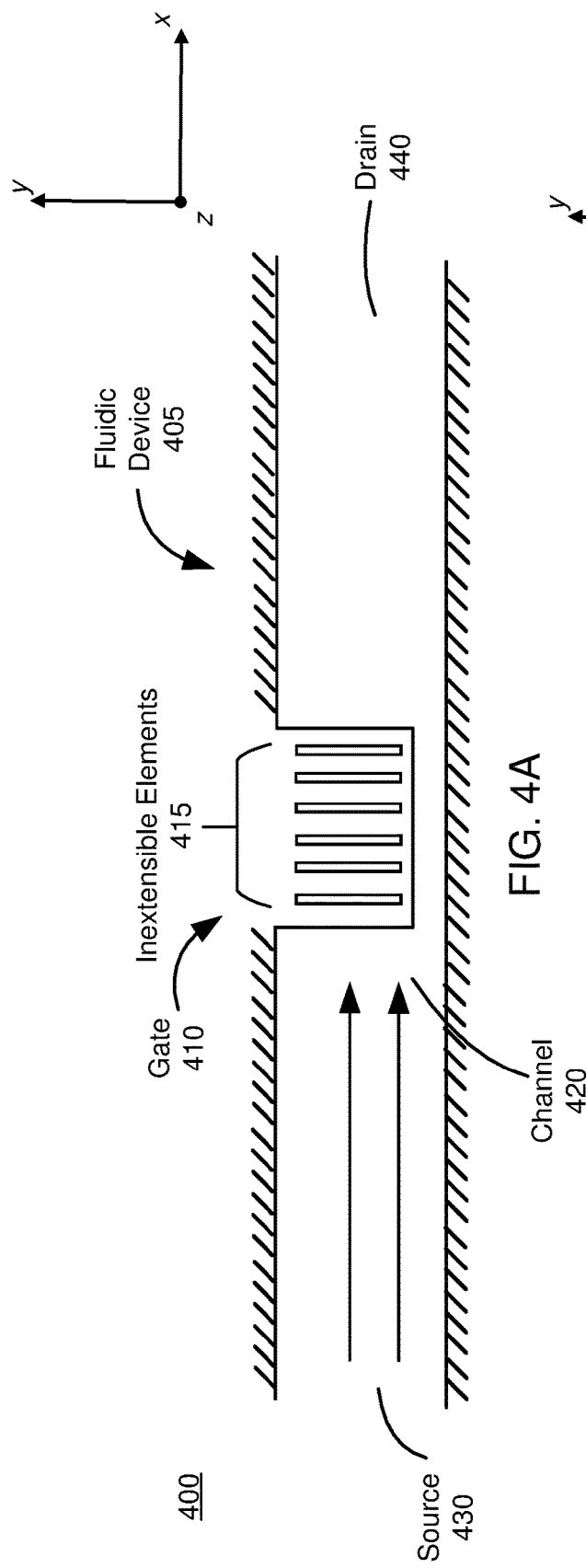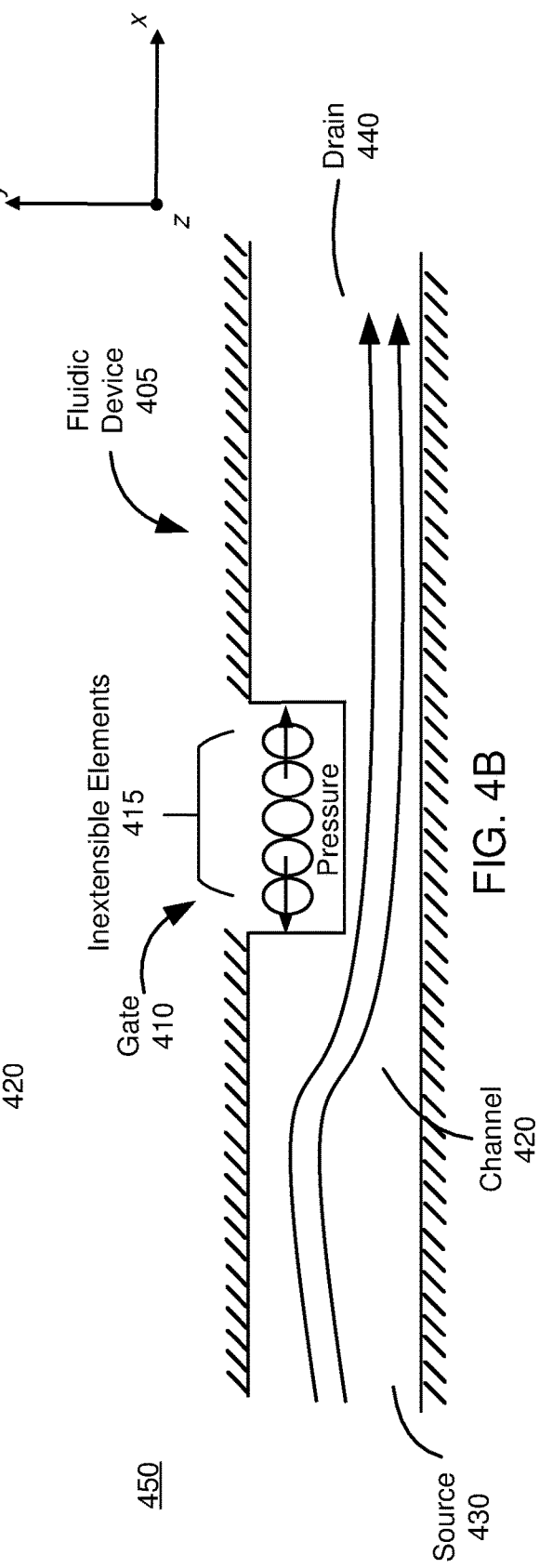

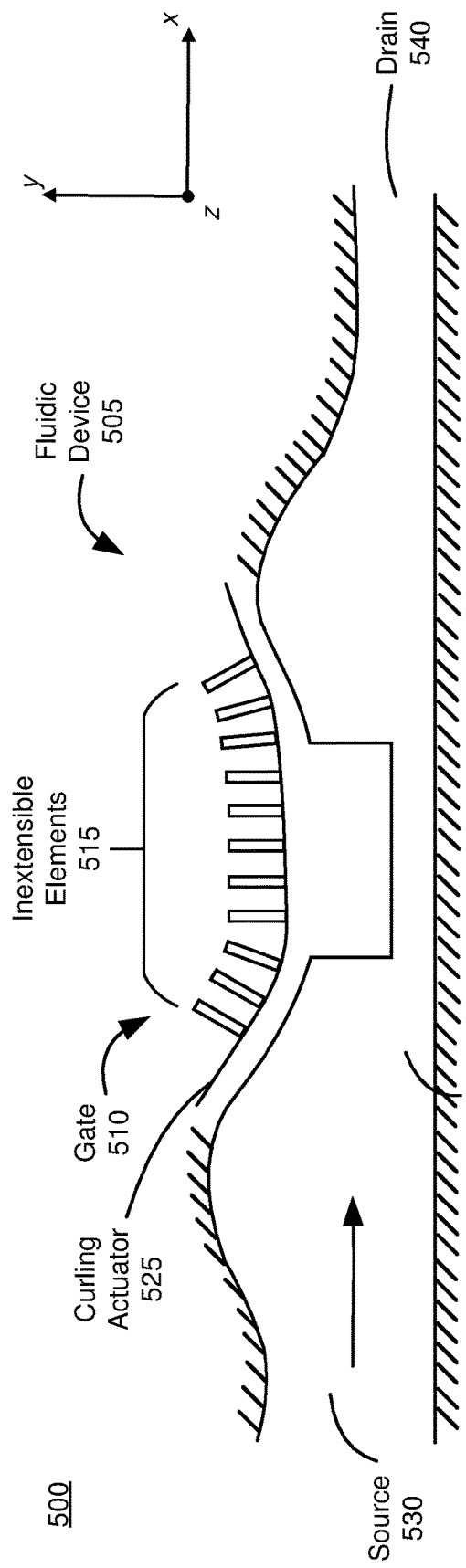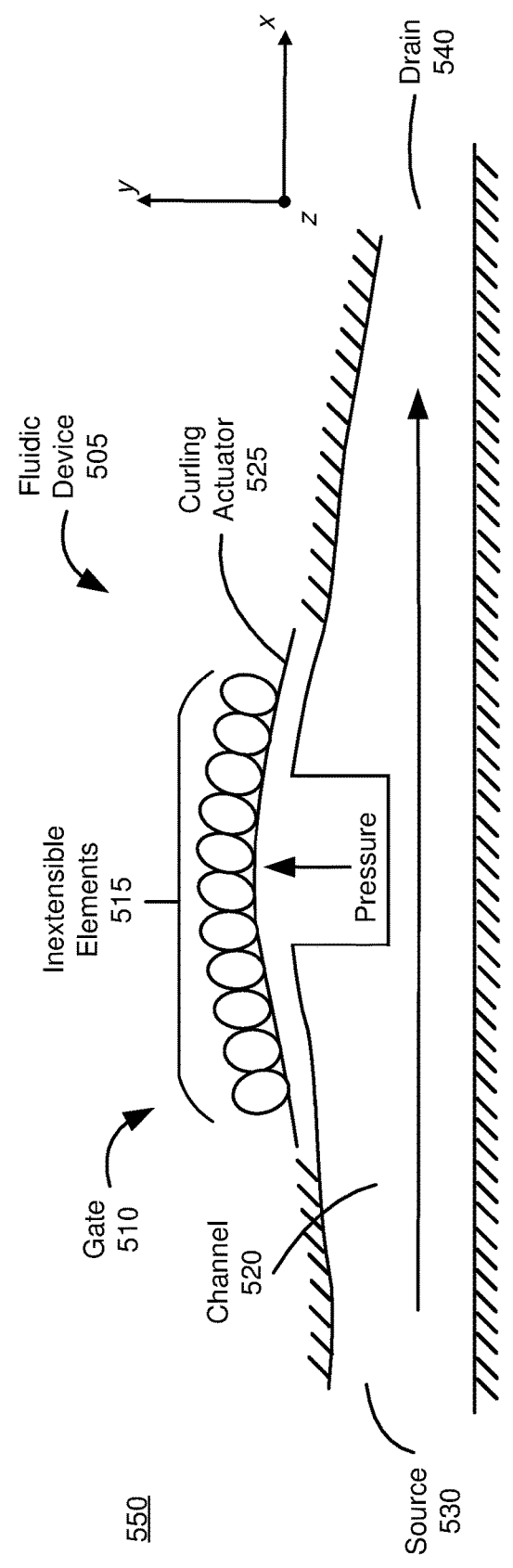

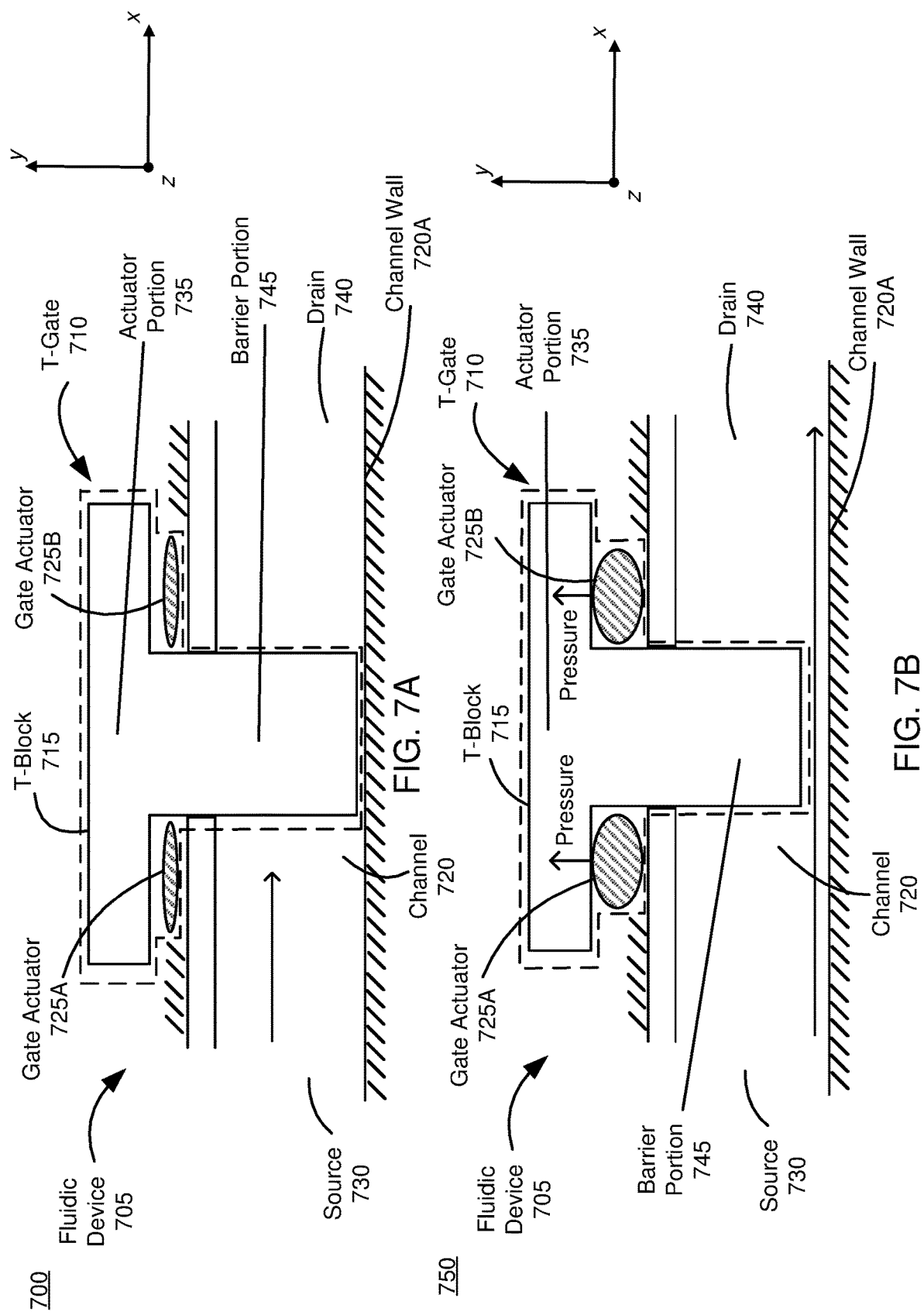

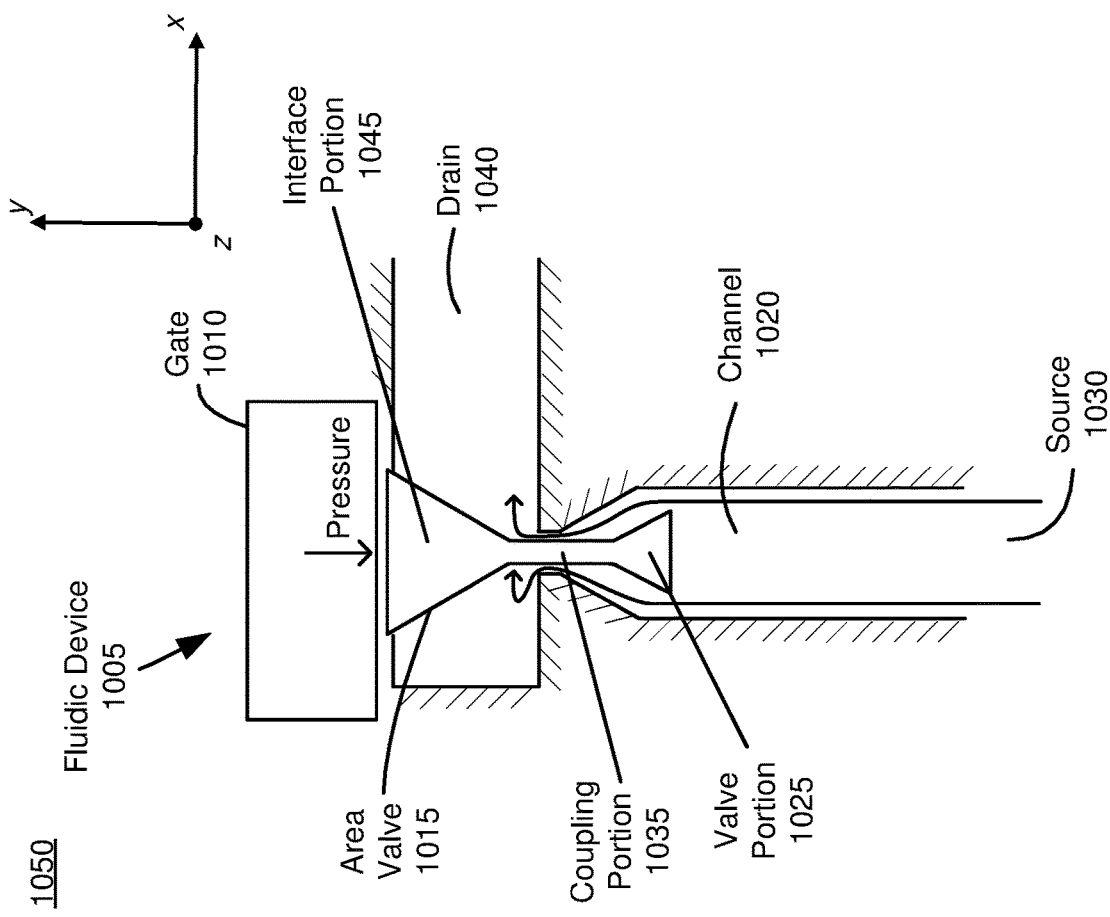
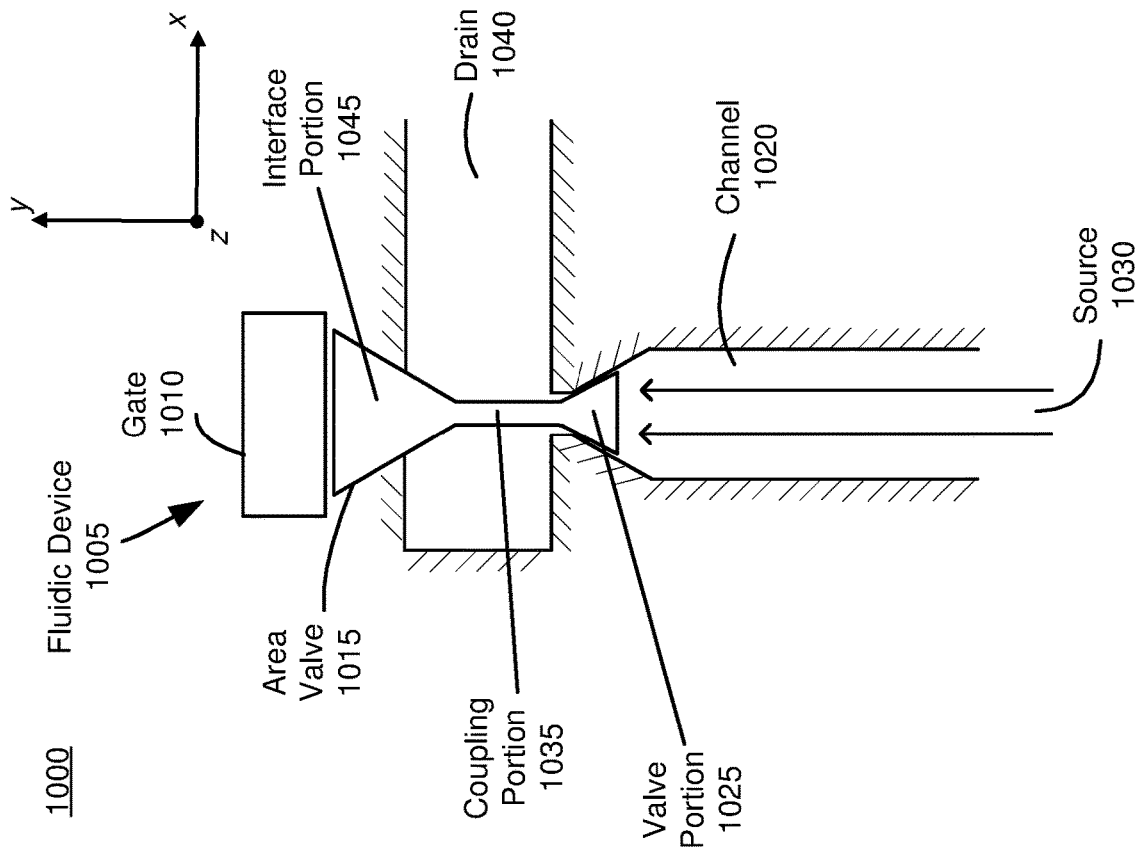

FLUIDIC SWITCHING DEVICES

BACKGROUND

The present disclosure generally relates to fluidic devices for head-mounted displays (HMD) and more specifically to fluidic switching devices for use in virtual reality, augmented reality, and/or mixed reality systems.

Virtual reality (VR) is a simulated environment created by computer technology and presented to a user, such as through a VR system. In some VR systems wearable devices (e.g., glove) allow a user to interact with virtual objects. Circuitry on such wearable devices can be complex, bulky, and in some cases heavy. As a result, conventional wearable devices can detract from a user's experience with a VR system.

SUMMARY

Embodiments of the disclosed invention include fluidic devices used in VR, augmented reality (AR) systems, and/or mixed reality (MR) systems. Fluidic devices are fluid handling devices that function analogous to electronic devices (e.g., an electrical transistor, an electrical diode, a resistor, a capacitor, etc.). For example, a fluidic device may be designed such that it operates as a fluidic transistor. Additionally, fluidic devices are composable, meaning that fluidic devices may be coupled together to form a composite fluidic device (e.g., a decoder). In some embodiments, groups of fluidic devices are coupled together to act as controllers for a haptic apparatuses on wearable devices (e.g., haptic gloves) for a VR system.

A fluidic device generally includes a channel that includes an input (e.g., a source) and an output (e.g. a drain). The channel directs a fluid (e.g., liquid or gas) from the input to the output. The fluidic device also includes a gate that affects the flow of fluid in the channel. For example, in some embodiments, once a threshold gate pressure is achieved (i.e., a high pressure state), the gate may restrict the fluid flow in the channel. In alternate embodiments, the flow in the channel is restricted until a threshold pressure (i.e., the high pressure state) in the gate is achieved.

In some embodiments, a fluidic device comprises a gate, a channel, and an obstruction. The gate comprises at least one chamber whose volume expands with fluid pressure within the chamber. In certain embodiments, a high pressure state of the gate corresponds to a first chamber size and a low pressure state of the gate corresponds to a second chamber size that is smaller than the first chamber size. The channel is configured to transport a fluid from a source to a drain. In some embodiments, the source is an input of fluid that enters the channel, and the drain is an output for the fluid in the channel. The obstruction controls a rate of fluid flow between the source and the drain in accordance with the fluid pressure within the gate. In some embodiments, the obstruction is configured to induce at least a first flow rate of the fluid in the channel in accordance with the low pressure state of the gate and a second flow rate of the fluid in the channel in accordance with the high pressure state of the gate.

In some embodiments, a fluidic device comprises a channel, a gate, and a channel partition. The channel is configured to transport a fluid from a source to a drain. In some embodiments, the source is an input that fluid enters the channel, and the drain is an output for the fluid in the channel. The gate comprises at least one gate valve and a gate membrane. The gate valve changes a fluid pressure differential between the source and the gate. The position of the gate membrane is changed based on the fluid pressure differential between the source and the gate. For example, in some embodiments, a small fluid pressure differential corresponds to a first position of the gate membrane and a large fluid pressure differential corresponds to a second position of the gate membrane. The second position of the gate membrane is further from the channel partition than the first position of the gate membrane. The channel partition controls a rate of fluid flow between the source and the drain in accordance with the position of the gate membrane. For example, in some embodiments the channel partition is configured to induce at most a first flow rate of the fluid in the channel in accordance with the first position of the gate membrane and at least a second flow rate of the fluid in the channel in accordance with the second position of the gate membrane.

In some embodiments, a fluidic device comprises a channel, a gate, and an alternate path. The channel is configured to transport a fluid from a source to a drain. In some embodiments, the source is a first input that fluid enters the channel from, and the drain is a first output for the fluid in the channel. The gate is configured to transport fluid into the channel. Thus the gate is a second input from which fluid enters the channel. The alternate path is configured to transport fluid out of the channel. Thus the alternate path is a second output for fluid in the channel. The alternate path is positioned with respect to the channel such that fluid entering the channel from the gate may combine with fluid traveling from the source. And the flow rate of the fluid entering the channel from the gate controls the flow rate of fluid to the drain and the flow rate of fluid toward the alternate path.

In some embodiments a fluidic device comprises a channel and a gate. The channel is configured to transport a fluid from a source to a drain. In some embodiments, the source is an input that fluid enters the channel from, and the drain is an output for the fluid in the channel. The gate comprises at least one membrane that changes conformation based on a fluid pressure differential between the channel and the gate. In some embodiments, a small fluid pressure differential corresponds to a first conformation of the membrane and a large fluid pressure differential corresponds to a second conformation of the membrane. In further embodiments, the second conformation of the membrane is more deformed relative to a resting conformation of the membrane than the first conformation of the membrane. In some embodiments, such a fluidic device may be incorporated into a haptic device.

In one embodiment, a wearable device is implemented in a system for providing VR, AR, MR, or some combination thereof, experience to a user who wears the device. In more detail, the wearable device provides haptic feedback to the user in response to instructions from a console of the system. The wearable device includes at least one actuator, and a controller. The controller is composed of a plurality of fluidic devices, including at least one fluidic device described herein. In some embodiments, the fluidic devices are coupled together to form one or more composite fluidic devices. For example, a composite device may be a decoder that is used to address the at least one actuator.

BRIEF DESCRIPTION OF THE FIGURES

FIG. 4A is a cross section of a fluidic device including a gate at a low pressure state, the gate including a plurality of inextensible elements, in accordance with an embodiment.

FIG. 4B is a cross section of the fluidic device shown in FIG. 4A, with the gate at a high pressure state, in accordance with an embodiment.

FIG. 5A is a cross section of a fluidic device including a gate at a low pressure state, the gate including a plurality of inextensible elements attached to a curling actuator, in accordance with an embodiment.

FIG. 5B is a cross section of the fluidic device shown in FIG. 5A, with the gate at a high pressure state, in accordance with an embodiment.

FIG. 7A is a cross section of the fluidic device including a lifting T-gate at a low pressure state, in accordance with an embodiment.

FIG. 7B is a cross section of the fluidic device shown in FIG. 7A with the gate actuators and at a high pressure state, in accordance with an embodiment.

FIG. 10A is a cross section of a fluidic device including a gate and an area valve, the gate at a low pressure state, in accordance with an embodiment.

FIG. 10B is a cross section of the fluidic device shown in FIG. 10A with the gate at a high pressure state, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Fluidic devices are fluid handling devices that function analogous to electronic devices (e.g., an electrical transistor, an electrical diode, a resistor, a capacitor, etc.). Tiny fluid (e.g., liquid or gas) devices are used in Virtual Reality (VR), augmented reality (AR) systems, and/or mixed reality (MR) systems. At a high level, the fluid devices function in a manner similar to conventional electrical transistors such that gate pressure may adjust a flow of a liquid through a channel from a source to a drain. The fluidic devices may function as, e.g., a high flow-rate valve, an inextensible gate valve, an inextensible gate valve with a curling actuator, a jet deflection amplifier, a lifting T-gate, a NFET buckling wall valve, a NFET pinch tube valve, a NFET relative area valve, a NFET tesla valve, a NFET relative area valve, a pre-loaded NFET, and a venturi valve. Various embodiments of fluidic devices are discussed in detail below with regard to FIGS. 3A-13B.

Additionally, the fluidic devices are "composable," in that a plurality of fluidic devices may be coupled together to generate larger structures. As a fluidic device may be designed to operate as, e.g., a fluidic transistor, multiple fluidic devices can be coupled together to create a composite device that performs certain logical functions in a manner analogous to electrical transistors being used together to form electrical circuits that perform logical functions (e.g., AND gate). Accordingly, a composite fluidic device may perform various logic functions including, e.g., an AND function, a NOT function, a NAND function, an OR function, a NOR function, an exclusive OR function, some other logical function, or some combination thereof. Moreover, multiple composite devices can be coupled together to form even larger fluidic circuits (e.g., a decoder, a controller in a haptic glove, etc.). The composite fluidic device may be structured to perform combination logic, sequential logic, or both, or it may be configured to pass values (e.g. a pass transistor or a pass-gate).

Figure 1:
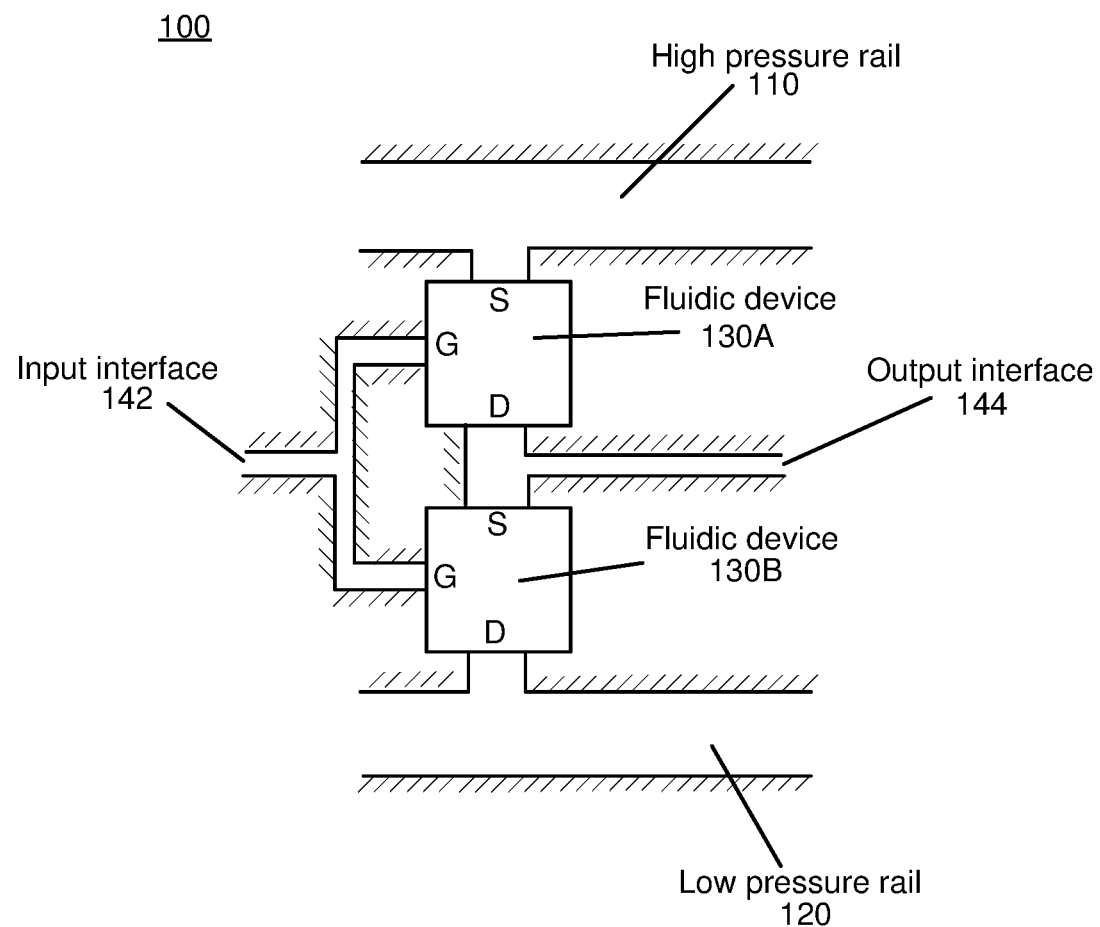
FIG. 1 is an example diagram of a composite fluidic device, in accordance with an embodiment.

FIG. 1 is an example diagram of a composite fluidic device 100, in accordance with an embodiment. The composite fluidic device 100 includes a high pressure rail 110, a low pressure rail 120, one or more fluidic devices 130A and 130B, an input interface 142 and an output interface 144. The diagram 100 shown in FIG. 1 is merely one example, and in alternative embodiments not shown, the diagram 100 may include additional/fewer or different fluidic devices between the high pressure rail 110 and the high pressure rail 120. Likewise, the various entities of the diagram 100 may differ in different embodiments.

The high pressure rail 110 is a structure that provides a fluid at a fixed pressure. The structure is made out of a material that does not readily deform at this pressure, or in another embodiment it is sufficiently capacitive that deformation does not render the device faulty. For example, the structure may be composed of, e.g., high-durometer polydimethylsiloxane (PDMS) and other polymers. In some embodiments, the structure may be flexible. The structure may have a circular cross section, a rectangular cross section, or some other cross section. Alternatively, the structure may be rigid or semi-rigid. The fixed pressure is relatively constant. In some embodiments, the high pressure rail 110 is connected to pressurized fluid source, one or more pumps, or some other device that may be used to ensure the fluid in the high pressure rail 110 is at the first pressure. The fluid may be a liquid or a gas. For example, the fluid may be water, deionized water, alcohol, oil, standard hydraulic fluids, air, and nitrogen. The pressure of fluid in the high pressure rail 110 is analogous to a rail voltage for a transistor in an electrical system, such that fluid flows away from the high pressure rail 110 toward areas with lower pressure much in the same way that a rail voltage provide potential for other parts of an electrical circuit. For example, a typical operating pressure of the fluid in the high pressure rail 110 can be 1-100 PSI (pounds per square inch).

The low pressure rail 120 is another structure that transmits the fluid. The low pressure rail 120 provides the fluid at a second pressure that is lower than the first pressure, and is generally at the lowest pressure within the composite fluidic device 100. The structure is made out of a material that does not deform at the first pressure. For example, the structure may be composed of, e.g., high-durometer PDMS, and other polymers. The low pressure rail 120 generally functions as a low pressure zone such that fluid from other parts of the composite fluidic device 100 coupled to the low pressure rail 120 flows toward the low pressure rail 120. The pressure of fluid in the low pressure rail 120 is analogous to an electrical ground in an electrical system. For example, the pressure of the fluid in the low pressure rail 120 can range from high vacuum to 15 PSI. High vacuum may be, e.g., an absolute pressure of $1.45 \times 10^{-5}$ PSI or less. In one embodiment, the upper end of the low pressure rail pressure value can be defined as a difference from the high pressure rail, and in this case it could be, e.g., 5 PSI below the high rail regardless of the absolute pressure value of the high rail.

The fluidic devices 130A, 130B are fluidic devices that function analogous to transistors in electrical systems, for example, a P-channel field-effect transistor (PFET), or an N-channel field-effect transistor (NFET). As shown in FIG. 1, each of the fluidic devices 130A and 130B includes a source, a drain, and a gate. In some embodiments, there is a channel filled with fluid between the source and the drain, and the pressure of the fluid in the source is higher than the pressure of the fluid in the drain, allowing the flow in the channel to flow from the source to drain when the channel is open. In one embodiment, when the gate is at a low pressure state, the channel is open; and when the gate is at a high pressure state, the channel is closed. In another embodiment, when the gate is at a high pressure state, the channel is in an open state; and when the gate is at a low pressure state, the channel is in a closed state.

An "open" state of the channel refers to a state when the fluid in the channel is flowing from one end (e.g., the source) to the other end (e.g., the drain) at some open threshold rate. For example, the open threshold rate may be 10 cc/s. The measurement "cc/s" used throughout the specification refers to "cubic-cm/sec." In contrast, a "closed" state of the channel refers to the state when the flow of fluid in the channel is less than some closed threshold rate. In some embodiments, the closed threshold rate may be zero flow. Alternatively, the closed threshold rate may be some rate of flow that is lower than the open threshold rate. For example, the closed threshold rate may be 0.1 cc/s. In addition, a "transitionary" state occurs when the channel transitions from an open state to a closed state or from a closed state to an open state. The "open" state of the channel is also referred to as an "ON" condition of a fluidic device, and the "closed" state of the channel is also referred to as an "OFF" condition of a fluidic device.

A "high pressure" and "low pressure" described here depends on the fluidic device structures and pressure of the fluid filling the fluidic device. In general, a "low pressure" is a pressure of the fluid that falls within a low pressure range, and a "high pressure" is a pressure of the fluid that falls within a high pressure range. The low pressure range may be thought of as a "0" and the high pressure range may be thought of as a "1." Accordingly, the fluidic devices 130A, 130B may operate digitally using the fluid at different pressures. Moreover, different components of a fluidic device may have different high pressure ranges and different low pressure ranges. For example, a high pressure range of a gate may be significantly less than a high pressure range of a source. The range of response times for a channel to open or close can be from 0.1 ms to 30 ms.

The input interface 142 is an interface that enables the fluidic devices 130A, 130B to receive inputs. In one embodiment, an input to the fluidic device 130 is fluid at a certain pressure that is applied to certain parts of the fluidic device that can cause the fluidic device to be either an "ON" or "OFF" condition. As one example, the input may be fluid at a certain pressure that is applied to the gates of the fluid devices 130A, 130B. Similarly, the output interface 144 is an interface that enables the fluidic devices 130A, 130B to provide outputs.

Figure 2:
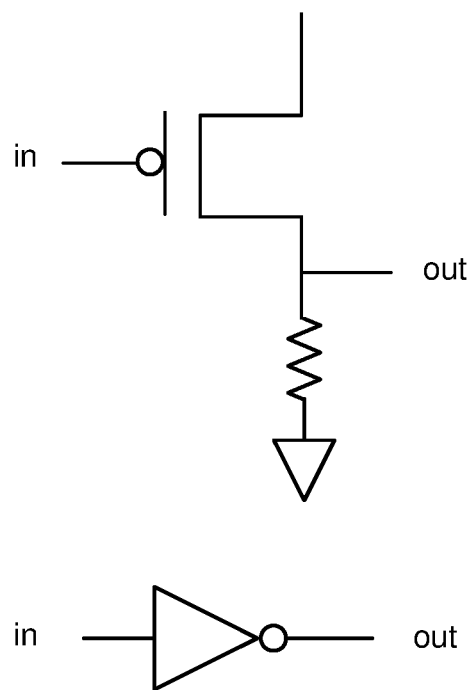
FIG. 2 is an example diagram a dual rail logic gate configured to perform a NOT function, according to an embodiment.

FIG. 2 is an example diagram 200 a dual rail logic gate configured to perform a NOT function, according to an embodiment.

In general, dual rail logic gates receive two different control inputs. The two different control inputs are mutually exclusive. In some embodiments, the first input does not equal the second input. One advantage of using a dual rail logic gate is that the gate may use one valve style, but can still perform various logic functions including, e.g., an AND function, a NOT function, a NAND function, an OR function, a NOR function, an exclusive OR function, some other logical function, or some combination thereof. For example, the dual rail logic gate depicted in FIG. 2 performs a "NOT" function. Additionally, by using multiple valves, low pressure inputs can be easily combined to create amplified, high pressure outputs. This increases the energy efficiency of the circuit.

Logic gates such as the "NOT" function of FIG. 2 are the fundamental building blocks used to build larger circuit elements such as transistors and resistors. Depending upon the combination and ordering of logic gates used, different transistors and resistors can be built. In the embodiment of the logic gate depicted in FIG. 2, the medium of the circuit is electricity. However, another possible medium of the circuit is any type of fluid. In fact, the subject matter of this disclosure focuses on fluidic transistors. In further embodiments, fluidic resistors can also be built using simple logic gates. In other words, just as electronic transistors and resistors can be built using combinations of different electric logic gates, fluidic transistors and resistors can also be built using combinations of different fluidic logic gates.

Figure 3A:
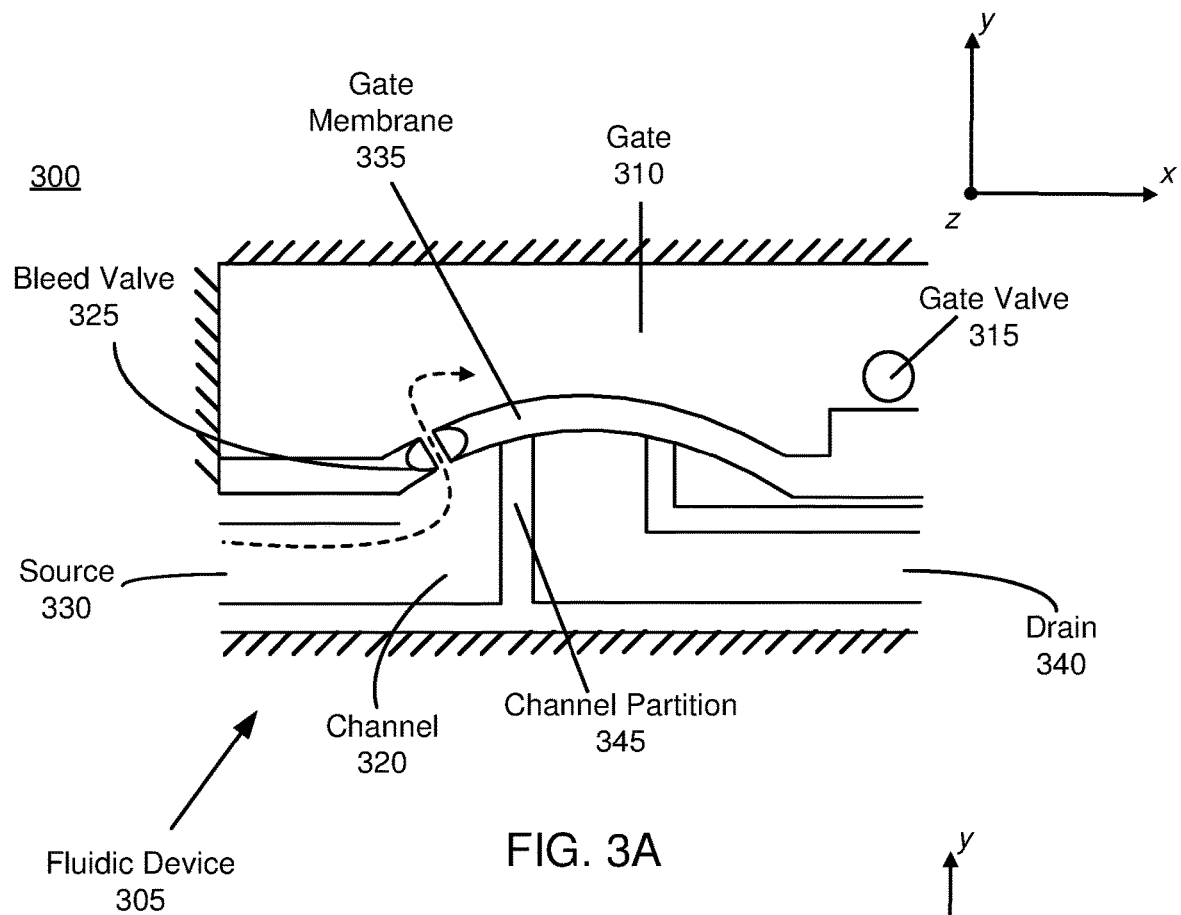
FIG. 3A is a cross section of a high flow-rate fluidic device including a gate, with the gate at a high pressure state, in accordance with an embodiment.

FIG. 3A is a cross section of a high flow-rate fluidic device 305 including a gate 310, with the gate 310 at a high pressure state, in accordance with an embodiment. The fluidic device 305 includes the gate 310, and a channel 320 that receives fluid from a source 330 and outputs the fluid to a drain 340. The channel 320 includes a channel partition 345 that may at least partially block fluid flow through the channel 320. The gate 310 includes a gate valve 315 that serves as an input and/or an output for fluid in the gate 310, and can dictate a pressure differential between the gate 310 and the source 330. The gate 310 also includes a gate membrane 335. The fluidic device 305 includes at least one bleed valve 325 that allows a small volume of fluid to travel at a relatively slow rate from the source 330 to the gate 310. In some embodiments, the fluidic device 305 is the fluidic device 130A or 130B shown in FIG. 1. In one embodiment, the source 330, the drain 340 and the gate 310 function analogous to a source, a drain, and a gate, respectively, in a field effect transistor in an electrical system.

The channel 320 is a structure that connects two ends that are referred to as the source 330 and the drain 340, and the channel 320 is filled with a fluid (e.g., liquid or gas). In one embodiment, the channel 320 can be a flexible tube filled with fluid. The channel 320 may have different types of shapes, sizes and/or be made from different materials. As one example, the cross section of the channel 320 may be circular, elliptical, square, rectangular, etc. The channel 320 may be composed of materials such as silicone (a type of elastomer), plastic, etc., and example materials used are polymers such as PDMS. The size can range from 50 um to 5 mm.

Figure 3B:
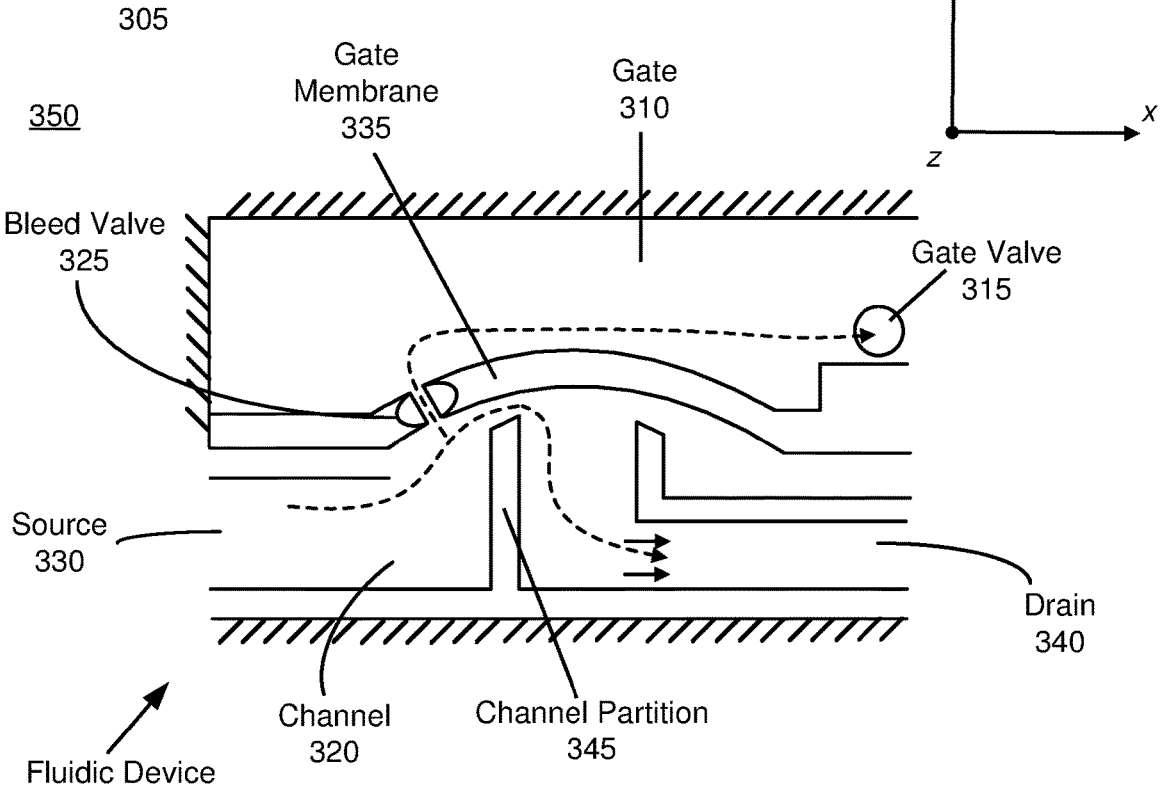
FIG. 3B is a cross section of the fluidic device shown in FIG. 3A with the gate at a low pressure state, in accordance with an embodiment.

The channel 320 includes the channel partition 345 that is positioned between the source 330 and the drain 340 such that fluid flow through the channel 320 may be at least partially blocked. Specifically, if the channel partition 345 is flush to the gate membrane 335 as seen in FIG. 3A, fluid flow from the source 330 to the drain 340 is entirely blocked. If the channel partition 345 is not flush to the gate membrane 335 as seen in FIG. 3B, fluid flow from the source 330 to the drain 340 is only partially hindered because fluid is able to travel around the channel partition 345 to reach the drain 340. Positioning of the gate membrane 335 with respect to the channel partition 345 is discussed in greater detail below.

The gate 310 is a part of the fluidic device 305 and functions analogous to a gate of an electronic transistor in an electrical system. The gate 310 may have different shapes, sizes and/or may be made from different materials. The gate 310 may be composed of materials such as silicone (a type of elastomer), plastic, etc., and example materials used are polymers such as PDMS.

The gate 310 includes the gate valve 315 and the gate membrane 335. The gate valve 315 serves as an output for fluid within the gate 310 and can dictate the pressure differential between the gate 310 and the source 330. In some embodiments, the gate valve 315 also serves as an input for fluid into the gate 310. For simplicity, the input and output of the gate valve 315 are not shown in FIGS. 3A and 3B. In some embodiments, the input to the gate valve 315 may be from some other fluidic device. Likewise, in some embodiments, the output of the gate valve 315 may be coupled to other fluidic devices. The gate 310 in FIG. 3A contains a single gate valve. In alternative embodiments, the gate 310 may contain a plurality of gate valves 315. In further embodiments, each of the plurality of gate valves 315 may serve different functions. For example, one gate valve 315 may serve as an input for fluid while another gate valve 315 may serve as an output for fluid. The gate valve 315 in FIG. 3A has a circular cross section and is embedded in a region of the gate 310 that is adjacent to the gate membrane 335. In alternative embodiments, the cross section of the gate valve 315 may be elliptical, square, rectangular, etc. For the fluidic device 305 to be in the "ON" condition, the channel 320 must be larger than the gate valve 315. Specifically, the larger the size ratio between the channel 320 and the gate valve 315, the greater the rate of fluid flow between the source and the drain. The gate membrane 335 is a flexible material that is located between the gate 310 and the channel 320. The gate membrane 335 is able to change its shape, and it is able to be displaced.

The gate membrane 335 includes at least one bleed valve 325. The bleed valve 325 enables fluid to flow from the source 330 into the gate 310. The flow of fluid through the bleed valve 325 may at least partially dictate the pressure differential between the gate 310 and the source 330. Specifically, the bleed valve 335 enables the equilibration of pressure between the source 330 and the gate 310. The tradeoff to making the gate valve 310 small relative to the channel 320 is that the channel 320 will open more slowly, and the tradeoff of making the bleed valve 325 small relative to the gate valve 315 is that the channel 320 will close more slowly. The size and quantity of the bleed valves 325 dictate the transition of the fluidic device 305 from the "OFF" condition to the "ON" condition. Specifically, for the fluidic device 305 to transition from the "OFF" condition to the "ON" condition, the bleed valve 325 is sized such that the following condition is true:

$$EP(g(\text{open}))*SA(gm(\text{open})) < P(s)*SA(gm(\text{outside})) + DP(\text{closed})*SA(gm(\text{inside})) \quad (1)$$

where EP(g(open)) is equilibrium pressure in the gate 310 with the gate valve 315 open, SA(gm(open)) is total area of the gate membrane 335, P(s) is pressure of the source 330, SA(gm(outside)) is area of the gate membrane 335 outside of the channel partition 345, DP(closed) is pressure of the drain 340 when closed, and SA(gm(inside)) is area of the gate membrane 335 inside of the channel partition 345. EP(g(open)) is based on the ratio of the size of the gate valve 315 to the size of the bleed valve 325. DP(closed) is at or near zero gauge pressure or atmospheric pressure.

The size and quantity of the bleed valves 325 also dictate the speed at which the pressure between the source 330 and the gate 310 can be brought to equilibrium and thus the speed at which the fluidic device 305 can return to the "OFF" condition. A fluidic device with a greater number of larger bleed valves 325 is able to equilibrate pressures and reset to the "OFF" condition more quickly than a fluidic device with fewer, smaller bleed valves 325. The size and quantity of the bleed valves 325 is dependent upon a size of the gate valve 315 and a size of the channel 320. In some embodiments, the quantity of the bleed valves 325 ranges from 1 to 10, and the diameter of each bleed valve 325 ranges from 5 um to 1 mm.

In the embodiment of the fluidic device 305 shown in FIG. 3A, the gate valve 315 is closed, and fluid flow through the gate valve 315 is less than a threshold rate (e.g., no fluid flow). Fluid from the source 330 is able to travel through the bleed valve 325. Because the gate valve 315 is closed and fluid is able to flow through the bleed valve 325, the pressure of the fluid at the source 330 equals the pressure of the fluid at the gate 310. In other words, a state of pressure equilibrium exists between the source 330 and the gate 310. In this state, the gate membrane 335 is flush to the channel partition 345 such that the channel 320 remains closed, and fluid is unable to flow from the source 330 to the drain 340. Thus the fluidic device 305 is in an "OFF" condition.

FIG. 3B is a cross section 350 of the fluidic device 305 shown in FIG. 3A with the gate 310 at a low pressure state, in accordance with an embodiment. In FIG. 3B, opening the output of the gate valve 315 results in a pressure at the gate 310 decreasing relative to a pressure at the source 330. Specifically, when the output of the gate valve 315 is opened such that fluid is able to flow out of the gate 310, a pressure differential is created between the gate 310 and the source 330. This occurs because while fluid flow from the source 330 through the bleed valve 325 and into the gate 310 continues to occur, the flow of the fluid through the bleed valve 315 occurs at a much slower rate compared to the flow of fluid out of the gate valve 315, and thus the pressure differential between the source 330 and the gate 310 is created. As a result of this pressure differential and the relatively low pressure at the gate 310, the gate membrane 335 moves towards the gate 310 and away from the channel 320 such that the gate membrane 335 is no longer flush to the channel partition 345 of the channel 320, and fluid can flow from the source 330 to the drain 340 at an open threshold rate such that the fluidic device 305 is in an "ON" condition.

The fluidic device 305 transits from a closed state (FIG. 3A) to an open state (FIG. 3B) by creating a fluidic pressure differential between the source 330 and the gate 310. During a transitionary period (not shown), the pressure differential between the gate 310 and the source 330 gradually increases, and the gate membrane 335 gradually moves towards the gate 310 and away from the channel 320 to increase the rate of the fluid flowing from the source 330 to the drain 340. When the fluid flow reaches an open threshold value, the fluidic device 305 is in an "ON" condition.

FIG. 4A is a cross section 400 of a fluidic device 405 including a gate 410 at a low pressure state, the gate including a plurality of inextensible elements 415, in accordance with an embodiment. The fluidic device 405 includes the gate 410, and a channel 420 that receives fluid flowing from a source 430 and outputs the fluid to a drain 440. The gate 410 includes the plurality of inextensible elements 415 that may receive and/or release fluid. In some embodiments, the fluidic device 400 is the fluidic device 130A or 130B shown in FIG. 1. In one embodiment, the source 430, the drain 440 and the gate 410 function analogous to the source, drain and gate in a field effect transistor in an electrical system.

The channel 420 is a structure that connects two ends that are referred to as the source 430 and the drain 440, and the channel 420 is filled with a fluid (e.g., liquid or gas). In one embodiment, the channel 420 can be a flexible tube filled with fluid. The channel 420 may have different types of shapes, sizes and/or be made from different materials. As one example, the cross section of the channel 420 may be circular, elliptical, square, rectangular, etc. The channel 420 may be composed of materials such as silicone (a type of elastomer), plastic, etc., and example materials used are polymers such as PDMS. The size can range from 50 um to 5 mm.

The gate 410 is a part of the fluidic device 405 and functions analogous to a gate of an electronic transistor in an electrical system. The gate 410 may have different shapes, sizes and/or may be made from different materials. In one embodiment, the gate 410 is made of a material such that the gate 410 is flexible and extensible. Accordingly, the size and the shape of the gate 410 may change. The gate 410 is inset within the channel 420 such that fluid flow between the source 430 and the drain 440 may be at least partially obstructed.

The gate 410 includes the plurality of inextensible elements 415 that may be inflated by input of fluid and/or may be deflated by output of fluid. For simplicity, the input and output of the inextensible elements 415 are not shown in FIGS. 4A and 4B. In some embodiments, the input to the inextensible elements 415 may receive fluid from some other fluidic device. Likewise, in some embodiments, the output of the inextensible elements 415 may be coupled to other fluidic devices. Each of the inextensible elements 415 may have different shapes, sizes and/or may be made from different materials. In one embodiment, the inextensible elements 415 are made of a material such that the inextensible elements 415 are flexible but inextensible. Accordingly, the inextensible elements 415 are able to change shape, but not size. In further embodiments, the inextensible elements 415 are configured such that the inextensible elements 415 are biased to expand in a certain dimension. For example, in the embodiment shown in FIGS. 4A and 4B, the inextensible elements 415 are configured such that when fluid pressure within the inextensible elements 415 is increased, the inextensible elements 415 are able to flex and expand primarily in a lateral direction.

As shown in FIG. 4A, when the gate 410 is in a low pressure state, the inextensible elements 415 are relatively long and thin, and the gate 410 inset within the channel 420 protrudes into the channel 420, effectively blocking fluid flow through the channel 420 such that flow is at a closed threshold rate and such that the fluidic device 405 is in an "OFF" condition.

FIG. 4B is a cross section 450 of the fluidic device 405 shown in FIG. 4A, with the gate 410 at a high pressure state, in accordance with an embodiment. The fluidic device 405 transits from a closed state (FIG. 4A) to an open state (FIG. 4B) by increasing fluid pressure at the gate 410. During a transitionary period (not shown), fluid pressure within the inextensible elements 415 of the gate 410 is increased causing the inextensible elements 415 to inflate and expand laterally. However, because the inextensible elements 415 are made of a flexible but inextensible material, this lateral expansion of the inextensible elements 415 causes the inextensible elements 415 to shrink in the vertical dimension in order to maintain a constant volume. This expansion of the inextensible elements 415 in the lateral direction and shrinking of the inextensible elements 415 in the vertical direction causes the gate 410 to expand laterally and shrink vertically as well as well. This shrinking of the gate 410 in the vertical dimension effectively decreases the distance that the gate 410 protrudes into the channel 420, thereby opening the channel 420 such that fluid can flow from the source 430 to the drain 440 at an open threshold rate such that the fluidic device 405 is in an "ON" condition.

FIG. 5A is a cross section 500 of a fluidic device 505 including a gate 510 at a low pressure state, the gate 510 including a plurality of inextensible elements 515 attached to a curling actuator 525, in accordance with an embodiment. The fluidic device 505 includes the gate 510, and a channel 520 that receives fluid flowing from a source 530 and outputs the fluid to a drain 540. The gate 510 includes the plurality of inextensible elements 515 that that may receive and/or release fluid. The plurality of inextensible elements 515 are attached to the curling actuator 525. In some embodiments, the fluidic device 500 is the fluidic device 130A or 130B shown in FIG. 1. In one embodiment, the source 530, the drain 540 and the gate 510 function analogous to the source, drain and gate in a field effect transistor in an electrical system.

The channel 520 is a structure that connects two ends that are referred to as the source 530 and the drain 540, and the channel 520 is filled with a fluid (e.g., liquid or gas). In one embodiment, the channel 520 can be a flexible tube filled with fluid. The channel 520 may have different types of shapes, sizes and/or be made from different materials. As one example, the cross section of the channel 520 may be circular, elliptical, square, rectangular, etc. The channel 520 may be composed of materials such as silicone (a type of elastomer), plastic, etc., and example materials used are polymers such as PDMS. The size can range from 50 um to 5 mm.

The gate 510 is a part of the fluidic device 505 and functions analogous to a gate of an electronic transistor in an electrical system. The gate 510 may have different shapes, sizes and/or may be made from different materials. In one embodiment, the gate 510 is made of a material such that the gate 510 is flexible and extensible. Accordingly, the size and the shape of the gate 510 may change. A portion of the gate 510 is inset within the channel 520 such that fluid flow between the source 530 and the drain 540 may be at least partially obstructed.

The gate 510 includes a plurality of inextensible elements 515 that may be inflated by input of fluid and/or may be deflated by output of fluid. For simplicity, the input and output of the inextensible elements 515 are not shown in FIGS. 5A and 5B. In some embodiments, the input to the inextensible elements 515 may receive fluid from some other fluidic device. Likewise, in some embodiments, the output of the inextensible elements 515 may be coupled to other fluidic devices. The inextensible elements 515 are attached to the curling actuator 525 (described in greater detail below) that is located above the portion of the gate 510 that is inset within the channel 520. Specifically, the inextensible elements 515 are attached to a face of the curling actuator 525 that is distal to the channel 520. Each of the inextensible elements 515 may have different shapes, sizes and/or may be made from different materials. In one embodiment, the inextensible elements 515 are made of a material such that the inextensible elements 515 are flexible but inextensible. Accordingly, the inextensible elements 515 are able to change shape, but not size. In further embodiments, the inextensible elements 515 are configured such that the inextensible elements 515 are biased to expand in a certain dimension. For example, in the embodiment shown in FIGS. 5A and 5B, the inextensible elements 515 are configured such that when fluid pressure within the inextensible elements 515 is increased, the inextensible elements 515 are able to flex and expand primarily in a lateral direction. However, because the inextensible elements 515 maintain the same volume, such expansion in the lateral dimension causes the inextensible elements 515 shrink in a vertical direction.

The curling actuator 525 is strip of material to which the inextensible elements 515 are attached. The curling actuator 525 is located above the portion of the gate 510 that is inset within the channel 520, and between the channel 520 and the inextensible elements 515 such that the inextensible elements 515 are attached to a face of the curling actuator 525 that is distal to the channel 520. The curling actuator 525 may be made from different materials. In some embodiments, the curling actuator 525 is configured such that the curling actuator 525 is biased to flex and change location in a certain direction. For example, in the embodiment shown in FIGS. 5A and 5B, the curling actuator 525 is configured such that when fluid pressure within the inextensible elements 515 is increased, the curling actuator 525 flexes and moves away from the channel 520. Such embodiments are discussed in greater detail below.

As shown in FIG. 5A, when the gate 510 is in a low pressure state, the inextensible elements 515 are relatively long and thin, and the curling actuator 525 to which the inextensible elements 515 are attached is arranged in a concave shape, with the peak of the concave shape located near the channel 520. This concave arrangement of the curling actuator 525 causes the gate 510 to protrude into the channel 520, effectively blocking fluid flow through the channel 520 such that flow is at a closed threshold rate and such that the fluidic device 505 is in an "OFF" condition.

FIG. 5B is a cross section 550 of the fluidic device 505 shown in FIG. 5A, with the gate 510 at a high pressure state, in accordance with an embodiment. The fluidic device 505 transits from a closed state (FIG. 5A) to an open state (FIG. 5B) by increasing fluid pressure at the gate 510. During a transitionary period (not shown), fluid pressure within the inextensible elements 515 of the gate 510 is increased causing the inextensible elements 515 to inflate and expand laterally. This lateral expansion of the inextensible elements 515 causes the arrangement of the inextensible elements 515 to shift into a convex arrangement with the peak of the convex arrangement facing away from the channel 520. As a result, the gate 510 is at least partially lifted out of the channel 520, thereby opening the channel 520 such that fluid can flow from the source 530 to the drain 540 an open threshold rate such that the fluidic device 505 is in an "ON" condition.

Figure 6A:
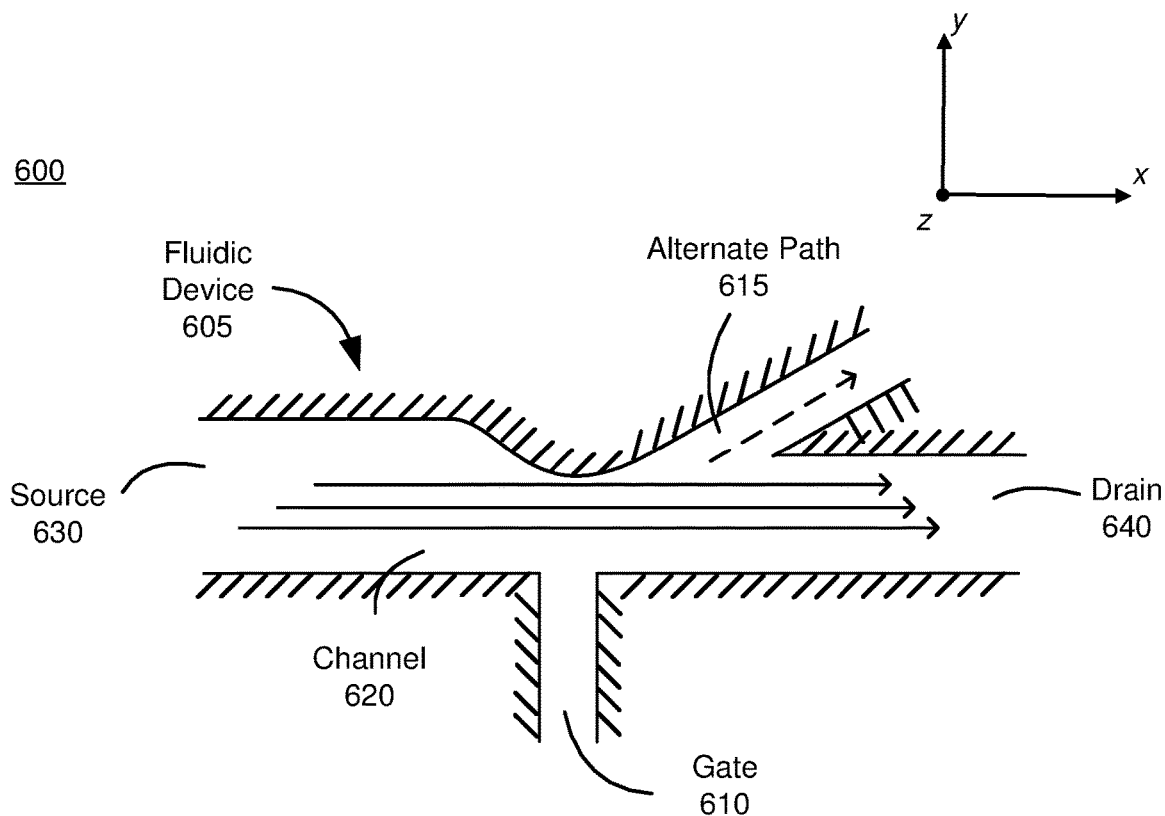
FIG. 6A is a cross section of a jet deflection amplifying fluidic device including a gate at a low pressure state, in accordance with an embodiment.
Figure 6B:
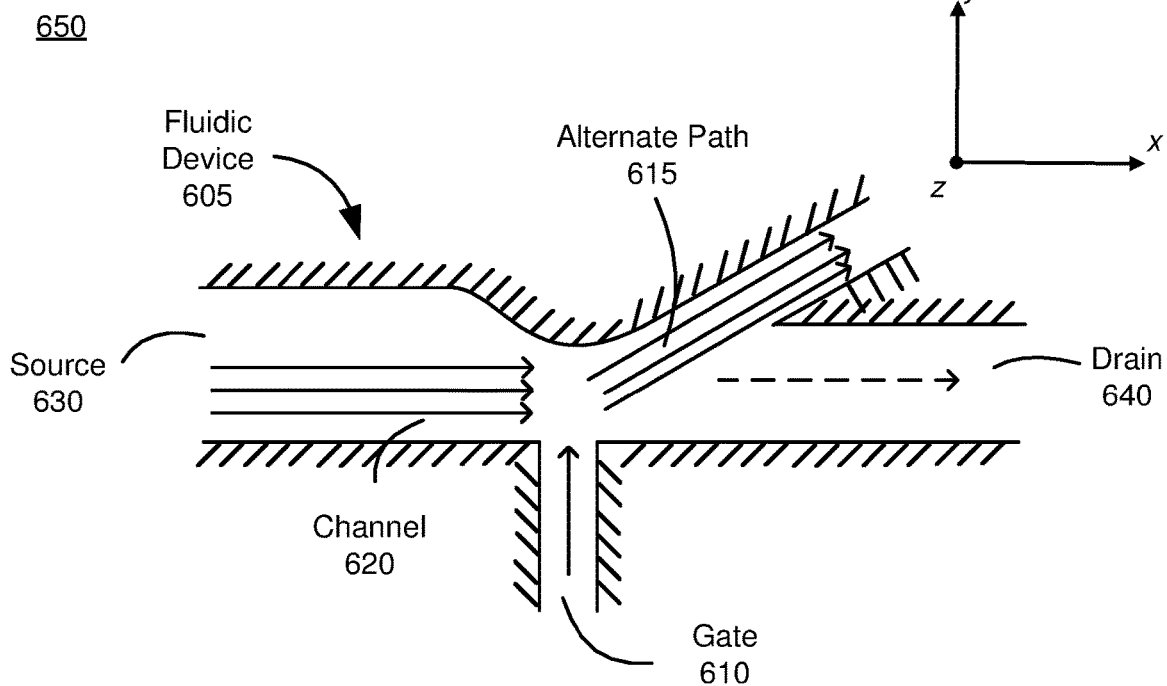
FIG. 6B is a cross section of the fluidic device shown in FIG. 6A, with the gate at a high pressure state, in accordance with an embodiment.

FIG. 6A is a cross section 600 of a jet deflection amplifying fluidic device 605 including a gate 610 at a low pressure state, in accordance with an embodiment. The fluidic device 605 includes the gate 610, and a channel 620 that receives fluid flowing from a source 630 and outputs the fluid to a drain 640. As seen in FIGS. 6A and 6B, the gate 610 is connected to the channel 620 such that fluid may flow from the gate 610 into the channel 620. In addition to the gate 610, an alternate path 615 is also connected to the channel 620 such that fluid may flow between the channel 620 and the alternate path 615. In some embodiments, the fluidic device 605 is the fluidic device 130A or 130B shown in FIG. 1. In one embodiment, the source 630, the drain 640 and the gate 610 function analogous to the source, drain and gate in a field effect transistor in an electrical system.

The channel 620 is a structure that connects two ends that are referred to as the source 630 and the drain 640, and the channel 620 is filled with a fluid (e.g., liquid or gas). In one embodiment, the channel 620 can be a flexible tube filled with fluid. The channel 620 may have different types of shapes, sizes and/or be made from different materials. As one example, the cross section of the channel 620 may be circular, elliptical, square, rectangular, etc. The channel 620 may be composed of materials such as silicone (a type of elastomer), plastic, etc., and example materials used are polymers such as PDMS. The size can range from 50 um to 5 mm.

The gate 610 is a part of the fluidic device 605 and functions analogous to a gate of an electronic transistor in an electrical system. As noted above, the gate 610 is connected to the channel 620 such that fluid can flow from the gate 610 into the channel 620. For simplicity, the input of the gate 610 is not shown in FIGS. 6A and 6B. In some embodiments, the input to the gate 610 may receive fluid from some other fluidic device. In one embodiment, the gate 610 can be a flexible tube filled with fluid. The gate 610 may have different types of shapes, sizes and/or be made from different materials. As one example, the cross section of the gate 610 may be circular, elliptical, square, rectangular, etc. The gate 610 may be composed of materials such as silicone (a type of elastomer), plastic, etc., and example materials used are polymers such as PDMS. In the embodiment shown in FIGS. 6A and 6B, the gate 610 is connected to the channel 620 at a 90 degree angle such that fluid from the gate 610 flows into the channel 620 perpendicular to the direction of fluid flow in the channel 620. However, in alternative embodiments, the gate 610 may be connected to the channel 620 at a range of angles.

The alternate path 615 is a part of the fluidic device 605 that is also connected to the channel 620 such that fluid can flow from the channel 620 into the alternate path 615. For simplicity, the output of the alternate path 615 is not shown in FIGS. 6A and 6B. In some embodiments, the output of the alternate path 615 may receive fluid from some other fluidic device. In one embodiment, the alternate path 615 can be a flexible tube filled with fluid. The alternate path 615 may have different types of shapes, sizes and/or be made from different materials. As one example, the cross section of the alternate path 615 may be circular, elliptical, square, rectangular, etc. The alternate path 615 may be composed of materials such as silicone (a type of elastomer), plastic, etc., and example materials used are polymers such as PDMS. The alternate path 615 is located downstream of the gate 610 (i.e. closer to the drain 640) on a side of the channel 620 that is opposite the gate 610. Furthermore, the alternate path 615 is connected to the channel 620 at an angle such that the combined volume of fluid from the gate 610 and the channel 620 can be redirected into the alternate path 615.

As shown in FIG. 6A, when the gate 610 is in a low pressure state, there is no fluid flow between the gate 610 and the channel 620. Because there is no fluid flow from the gate 610 to the channel 620, fluid is able to flow unhindered from the source 630 to the drain 640 at an open threshold rate such that the fluidic device is in an "ON" condition. Note that a relatively small amount of fluid may flow from the channel 620 to the alternate path 615, but this amount of fluid is negligible compared to the amount of fluid that flows into the drain 640.

FIG. 6B is a cross section 650 of the fluidic device 605 shown in FIG. 6A, with the gate 610 at a high pressure state, in accordance with an embodiment. The fluidic device 605 transits from an open state (FIG. 6A) to a closed state (FIG. 6B) by increasing fluid pressure at the gate 610. During a transitory period (not shown), fluid pressure within the gate 610 is gradually increased causing fluid flow from the gate 610 into the channel 620 to increase. This results in fluid within the channel 620 being redirected to the alternate path 615. Specifically, fluid from the gate 610 enters the channel 620 at an orientation that is perpendicular to the fluid flowing through the channel 620. The velocity of the fluid flowing from the gate 610 and of the velocity of the fluid flowing through the channel 620 can be combined, and result in an average velocity that is directed to the alternate path 615. Thus fluid originating from both the source 630 and from the gate 610 flows into the alternate path 615. This redirection of fluid to the alternate path 615 effectively blocks fluid flow into the drain 640 such that flow is at a closed threshold rate and such that the fluidic device 605 is in an "OFF" condition. Note that a relatively small amount of fluid may flow to the drain 640, but this amount of fluid is negligible compared to the amount of fluid that flows into the alternate path 615.

FIG. 7A is a cross section 700 of the fluidic device 705 including a lifting T-gate 710 at a low pressure state, in accordance with an embodiment. The fluidic device 705 includes the T-gate 710, and a channel 720 that receives fluid flowing from a source 730 and outputs the fluid to a drain 740. The T-gate 710 includes a T-block 715 and gate actuators 725A and 725B. The gate actuators 725A and 725B serve to displace the T-block 715 such that the T-block 715 is able to regulate fluid flow through the channel 720. In some embodiments, the fluidic device 705 is the fluidic device 130A or 130B shown in FIG. 1. In one embodiment, the source 730, the drain 740 and the T-gate 710 function analogous to the source, drain and gate in a field effect transistor in an electrical system.

The channel 720 is a structure that connects two ends that are referred to as the source 730 and the drain 740, and the channel 720 is filled with a fluid (e.g., liquid or gas). In one embodiment, the channel 720 can be a flexible tube filled with fluid. The channel 720 may have different types of shapes, sizes and/or be made from different materials. As one example, the cross section of the channel 720 may be circular, elliptical, square, rectangular, etc. The channel 720 may be composed of materials such as silicone (a type of elastomer), plastic, etc., and example materials used are polymers such as PDMS. The size can range from 50 um to 5 mm. As seen in FIGS. 7A and 7B, the channel 720 includes a channel wall 720A. The channel wall 720A is discussed in greater detail below.

The T-gate 710 is a part of the fluidic device 705 and functions analogous to a gate of an electronic transistor in an electrical system. The T-gate 710 includes the T-block 715 and the gate actuators 725A and 725B. The T-block 715 may have different types of shapes, sizes and/or be made from different materials. In the embodiment shown in in FIG. 7A, the T-block 715 is shaped like the letter "T." However in alternative embodiments, the T-block 715 may take other shapes as well. For example, the T-block 715 may be shaped like a ring, the letter "X", etc.

The T-block 715 is positioned within an opening of the channel 720 that is located opposite the channel wall 720A, and comprises two portions: an actuator portion 735 and a barrier portion 745. The actuator portion 735 includes the two arms of the T-block 715 and is the portion of the T-block that is located outside of the channel 720. The actuator portion 735 of the T-block 715 interacts with the gate actuators 725A and 725B, as described in greater detail below. The barrier portion 745 is the portion of the T-block that protrudes into the channel 720 towards the channel wall 720A, at least partially obstructing the channel 720. The T-block 715 is able to translate vertically within the opening of the channel 720 such that the distance that the barrier portion 745 of the T-block 715 protrudes into the channel 720 can be increased or decreased. Specifically, the T-block 715 is able to translate vertically within the opening of the channel 720 such that the distance between the barrier portion 745 of the T-block 715 and the channel wall 720A can be increased or decreased. The T-block 715 fits within the opening of the channel 720 such that fluid within the channel 720 is unable to escape through the opening.

The gate actuators 725A and 725B are located outside of the channel 720. Specifically, each of the gate actuators 725A and 725B is located between the channel 720 and an arm of the T-block 715. Each of the gate actuators 725A and 725B may be inflated by input of fluid and/or may be deflated by output of fluid. For simplicity, the input and output of the gate actuators 725A and 725B are not shown in FIGS. 7A and 7B. In some embodiments, the input to the gate actuators 725A and 725B may receive fluid from some other fluidic device. Likewise, in some embodiments, the output of the gate actuators 725A and 725B may be coupled to other fluidic devices. The gate actuators 725A and 725B may have different shapes, sizes and/or may be made from different materials. In some embodiments, the gate actuators 725A and 725B are made of a flexible and extensible material such that the gate actuators 725A and 725B may be inflated by increasing the pressure of fluid within the gate actuators 725A and 725B. Similarly, the gate actuators 725A and 725B may be deflated by decreasing the pressure of fluid within the gate actuators 725A and 725B. The gate actuators 725A and 725B may have different types of shapes and sizes. As one example, the cross section of the gate actuators 725A and 725B may be circular, elliptical, square, rectangular, etc.

As shown in FIG. 7A, while the gate actuators 725A and 725B are in a low pressure state, they are deflated. As a result, the arms of the actuator portion 735 of the T-block 715 rest near the channel 720, and the barrier portion 745 of the T-block 715 protrudes into the channel 720 and in close proximity to the channel wall 720A such that flow from the source 730 to the drain 740 is at a closed threshold rate such that the fluidic device 705 is in an "OFF" condition.

FIG. 7B is a cross section 750 of the fluidic device 705 shown in FIG. 7A with the gate actuators 725A and 725B at a high pressure state, in accordance with an embodiment. In FIG. 7B, the fluid pressure within the gate actuators 725A and 725B is such that the gate actuators 725A and 725B have inflated to exert pressure on the arms of the T-block 715, effectively displacing the T-block 715 away from the channel wall 720A. By pushing the T-block 715 away from the channel wall 720A, the T-block 715 is partially lifted out of the channel 720 such that the distance that the barrier portion 745 of the T-block 715 protrudes into the channel 720 is decreased. This lifting of the T-block 715 out of the channel 720 creates a path for fluid flow from the source 730 to the drain 740 and increases the flow rate in the channel 720 to an open threshold rate such that the fluidic device 705 is in an "ON" condition.

The fluidic device 705 transits from a closed state (FIG. 7A) to an open state (FIG. 7B) by increasing fluid pressure at the gate actuators 725A and 725B. During a transitionary period (not shown), the gate actuators 725A and 725B expand (with increasing pressure) to lift the T-block 715 away from the channel wall 720A and partially out of the channel 720 such that the rate of fluid flow from the source 730 to the drain 740 is increased. When the fluid flow reaches an open threshold value, the fluidic device 705 is in an "ON" condition.

In alternative embodiments not shown in FIGS. 7A and 7B, the gate actuators 725A and 725B may not have a flexible shape that can expand or shrink with the different pressure applied within the gate actuators 725A and 725B. In this case, instead of expanding to lift the T-block 715 and open the channel 720, extra pressure from outside the gate actuators 725A and 725B may be applied to the gate actuators 725A and 725B to make the gate actuators 725A and 725B move toward the actuator portion 735 of the T-block 715 such that the T-block 715 moves away from the channel wall 720A, causing the channel 720 to be opened. For example, co-casted materials may be placed around the gate actuators 725A and 725B such that the gate actuators 725A and 725B substantially deform only in the direction of the actuator portion 735 of the T-block 715. Co-casted materials and their use in fluidic devices is further described in U.S. Provisional Patent Application No. 62/399,153, filed on Sep. 23, 2016, which is hereby incorporated by reference in its entirety.

Figure 8A:
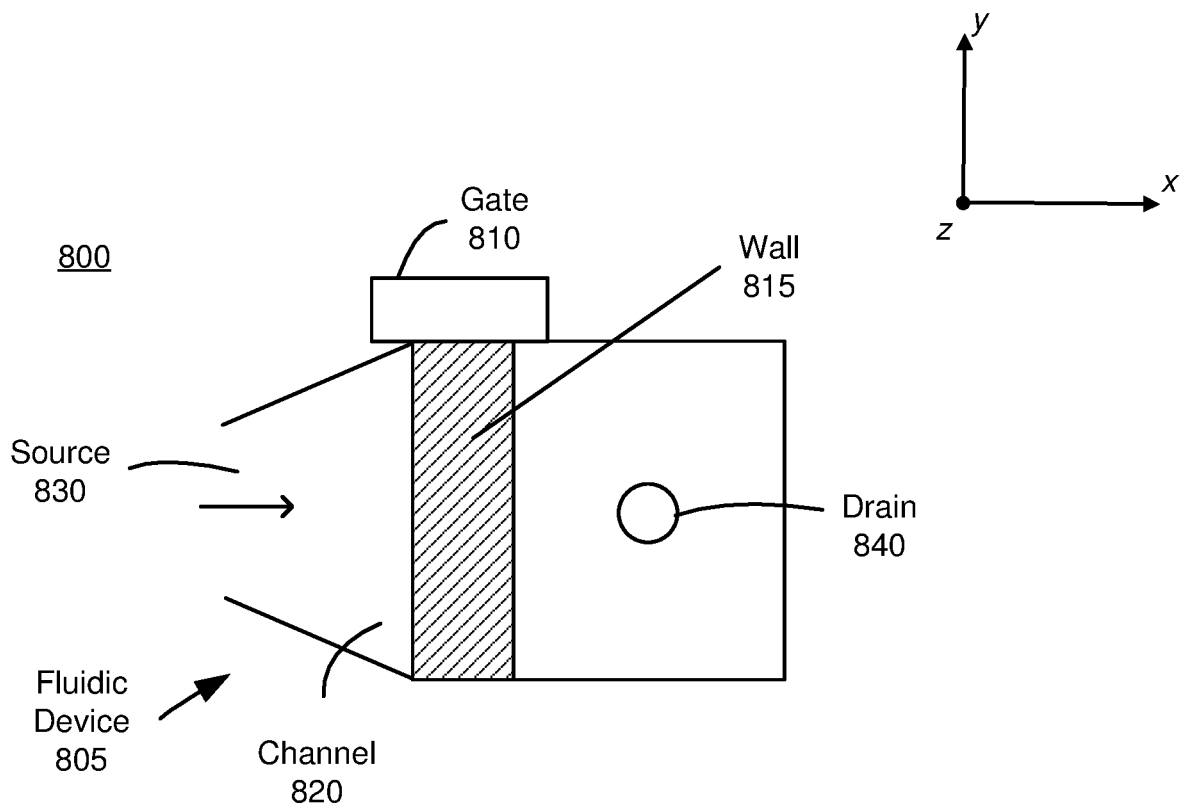
FIG. 8A is a side view in the y-x plane of a fluidic device including a gate and a NFET buckling wall, with the gate at a low pressure state, in accordance with an embodiment.
Figure 8B:
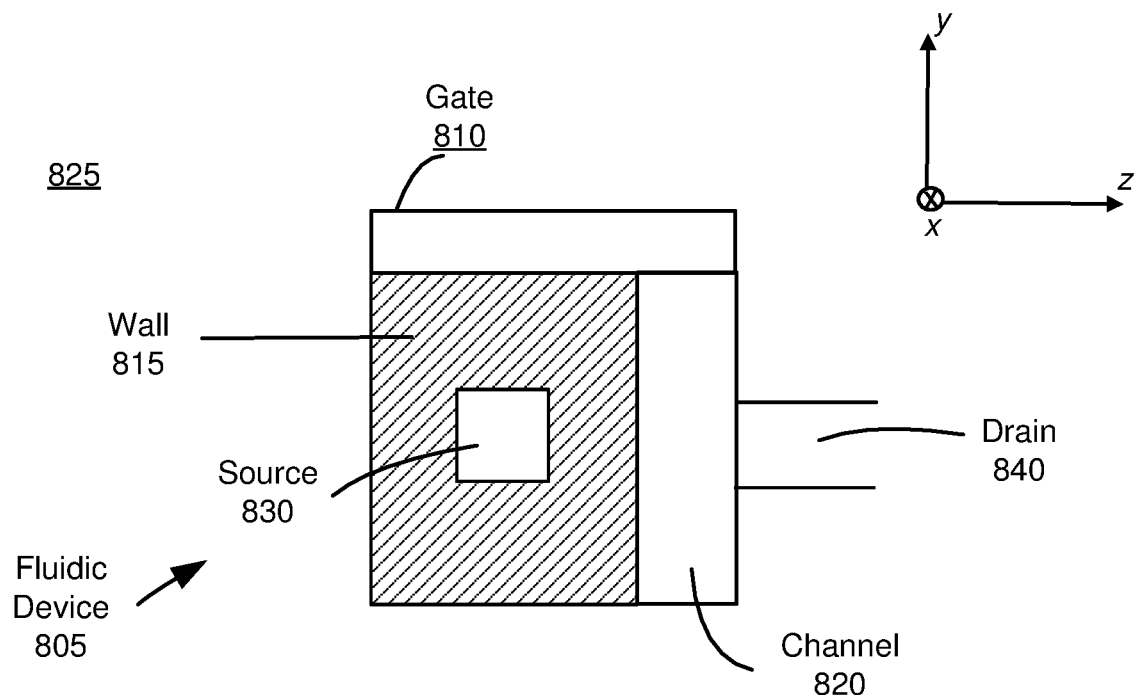
FIG. 8B is an alternative side view of the fluidic device of FIG. 8A in the y-z plane, according to an embodiment.
Figure 8C:
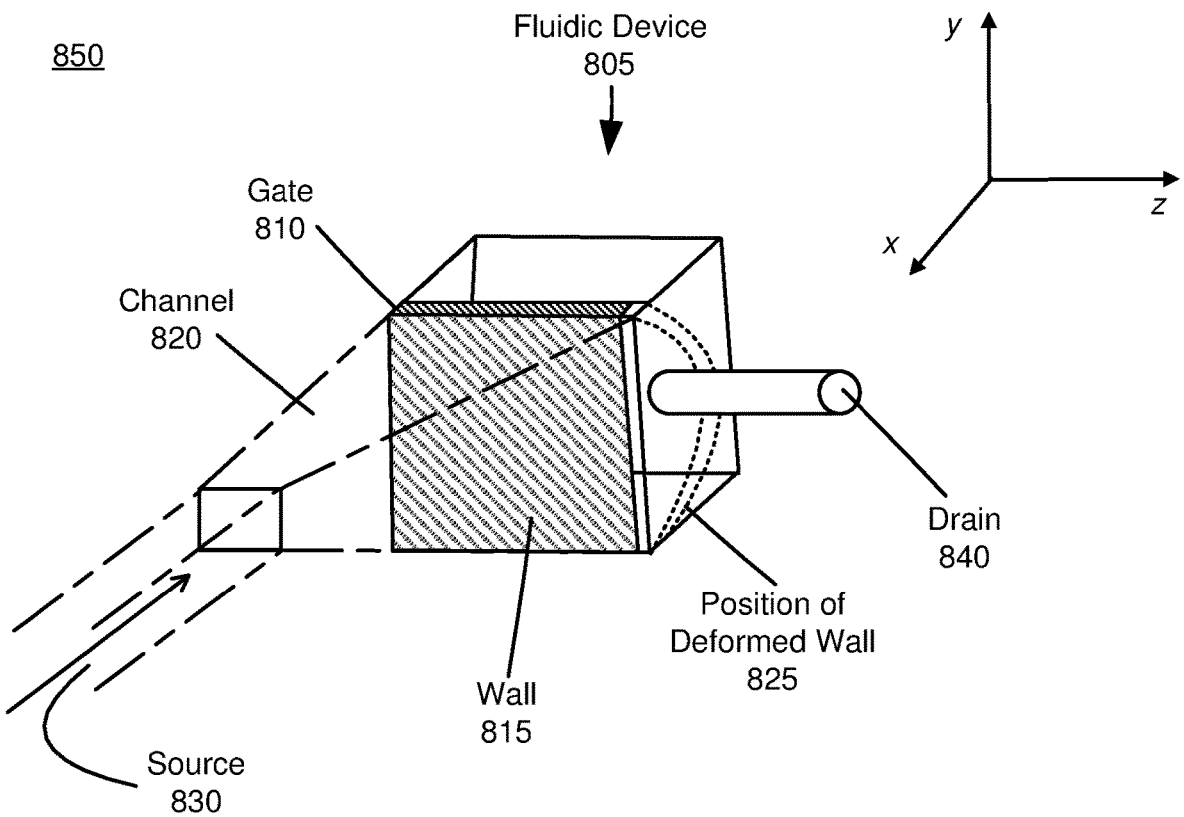
FIG. 8C is an isometric view of the fluidic device of FIG. 8A, in accordance with an embodiment.

FIG. 8A is a side view 800 in the y-x plane of a fluidic device 805 including a gate 810 and a NFET buckling wall 815, with the gate 810 at a low pressure state, in accordance with an embodiment. FIG. 8B is an alternative side view of the fluidic device 805 of FIG. 8A in the y-z plane, according to an embodiment. FIG. 8C is an isometric view of the fluidic device 805 of FIG. 8A, in accordance with an embodiment. The fluidic device 805 includes the gate 810, and a channel 820 that receives fluid flowing from a source 830 and outputs the fluid to a drain 840. The fluidic device 805 also includes the wall 815 located within the channel 820 between the source 830 and the drain 840. The wall 815 is designed to work in combination with the gate 810 regulate fluid flow through the channel 820. In some embodiments, the fluidic device 805 is the fluidic device 130A or 130B shown in FIG. 1. In one embodiment, the source 830, the drain 840 and the gate 810 function analogous to the source, drain and gate in a field effect transistor in an electrical system.

The channel 820 is a structure that connects two ends that are referred to as the source 830 and the drain 840, and the channel 820 is filled with a fluid (e.g., liquid or gas). In one embodiment, the channel 820 can be a flexible tube filled with fluid. The channel 820 may have different types of shapes, sizes and/or be made from different materials. As one example, the cross section of the channel 820 may be circular, elliptical, square, rectangular, etc. The channel 820 may be composed of materials such as silicone (a type of elastomer), plastic, etc., and example materials used are polymers such as PDMS. The size can range from 50 um to 5 mm.

The gate 810 is a part of the fluidic device 805 and functions analogous to a gate of an electronic transistor in an electrical system. The gate 810 may be inflated by input of fluid and/or may be deflated by output of fluid. For simplicity, the input and output of the gate 810 are not shown in FIGS. 8A-C In some embodiments, the input to the gate 810 may receive fluid from some other fluidic device. Likewise, in some embodiments, the output of the gate 810 may be coupled to other fluidic devices. The gate 810 is located outside of the channel 820 above the wall 815. As described below, in one embodiment the gate 810 is located adjacent to the wall 815. In another embodiment, the gate 810 may be connected to the wall 815. The gate 810 may have different shapes, sizes and/or may be made from different materials. As one example, the cross section of the channel gate 810 may be circular, elliptical, square, rectangular, etc. In one embodiment, the gate 810 is made of a material such that the gate 810 is flexible and extensible. Accordingly, the gate 810 may change its shape and size. In further embodiments, the gate 810 is configured such that the gate 810 is biased to expand in a certain direction when filled with fluid. For example, in the embodiment shown in FIGS. 8A-C, the gate 810 is configured such that when fluid pressure within the gate 810 is increased, the gate 810 expands primarily toward the wall 815. To accomplish this bias in the gate 810, some embodiments, one or more sides of the gate 810 opposite the wall 815 may be non-extensible. Such embodiments are discussed in greater detail below.

Figure 8D:
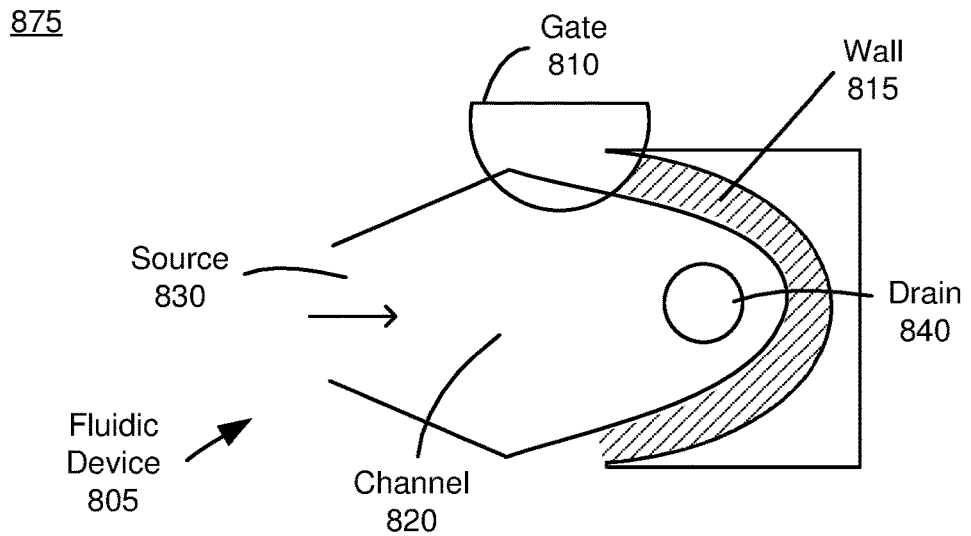
FIG. 8D is a side view in the y-x plane of the fluidic device shown in FIGS. 8A-C, with the gate at a high pressure state, in accordance with an embodiment.

The wall 815 is located within the channel 820 between the source 830 and the drain 840 such that fluid flow between the source 830 and the drain 840 may be at least partially obstructed by the wall 815. In certain embodiments, the wall 815 includes one or more slits (not shown) that allow a relatively small amount of fluid to leak through the wall 815 from the source 830 to the drain 840. As noted above, the wall 815 is located adjacent to the gate 810 in some embodiments. In other embodiments, the wall 815 may be connected to the gate 810 and to an interior face of the channel 820 that is located opposite the gate 810. The wall 815 is made of a material such that the wall 815 is flexible. Accordingly, the shape of the wall 815 may change and the wall 815 may be displaced and/or deflected. Specifically, the wall 815 is flexible enough such that it is able to bend to at least partially expose the drain 840, as seen in FIG. 8D and discussed in greater detail below. In some embodiments, the wall 815 may be biased to bend in a specific direction. For example, the wall 815 may be biased to bend towards the drain 840. To bias the direction in which the wall 815 bends, the wall 815 may be slightly pre-bent in that direction. In alternative embodiments, the wall 815 may have a material composition and/or structure such that it biased to bend in the specific direction.

As shown in FIGS. 8A-C, when the gate 810 is in a low pressure state, the wall 815 remains fixed within the channel 820 between the source 830 and the drain 840 such that fluid flow from the source 830 to the drain 840 is at a closed threshold rate and such that the fluidic device 805 is in an "OFF" condition.

FIG. 8D is a side view 875 in the y-x plane of the fluidic device 805 shown in FIGS. 8A-C, with the gate 810 at a high pressure state, in accordance with an embodiment. The fluidic device 805 transits from a closed state (FIGS. 8A-C) to an open state (FIG. 8D) by increasing pressure in the gate 810 and causing deflection of a wall 815. During a transitionary period (not shown), pressure within the gate 810 is increased, causing the gate 810 to inflate and expand in the direction of the wall 815. This expansion results in application of pressure to the wall 815 which causes the wall 815 to bend and deflect within the channel 820 and around the drain 840 such that the drain 840 is at least partially exposed and fluid can flow from the source 830 to the drain 840 at an open threshold rate such that the fluidic device 805 is in an "ON" condition. Note that FIG. 8C also depicts one embodiment of a position of the deformed wall 825 after it has bent to expose the drain 840.

In alternative embodiments not shown in FIGS. 8A-D, the gate 810 may not have a flexible shape that can expand or shrink with the different pressure applied within the gate 810. In this case, instead of expanding to displace the wall 815 around the drain 840 and open the channel 820, extra pressure from outside the gate 810 may be applied to the gate 810 to make the gate 810 move toward the wall 815 such that the wall 815 is displaced around the drain 840, causing the channel 820 to be opened. For example, co-casted materials may be placed around the gate 810 such that the gate 810 substantially deform only in the direction of the wall 815. Co-casted materials and their use in fluidic devices is further described in U.S. Provisional Patent Application No. 62/399,153, filed on Sep. 23, 2016, which is hereby incorporated by reference in its entirety.

Figure 9B:
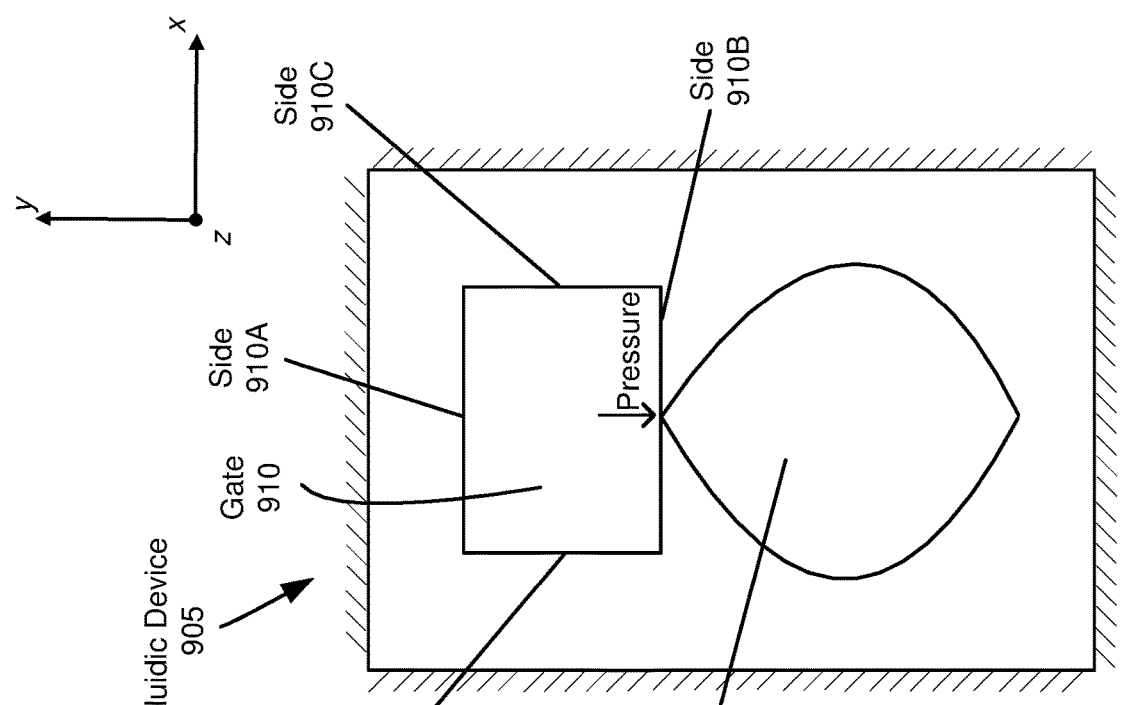
FIG. 9B is a cross section of the fluidic device shown in FIG. 9A with the gate at a high pressure state, in accordance with an embodiment.
Figure 9A:
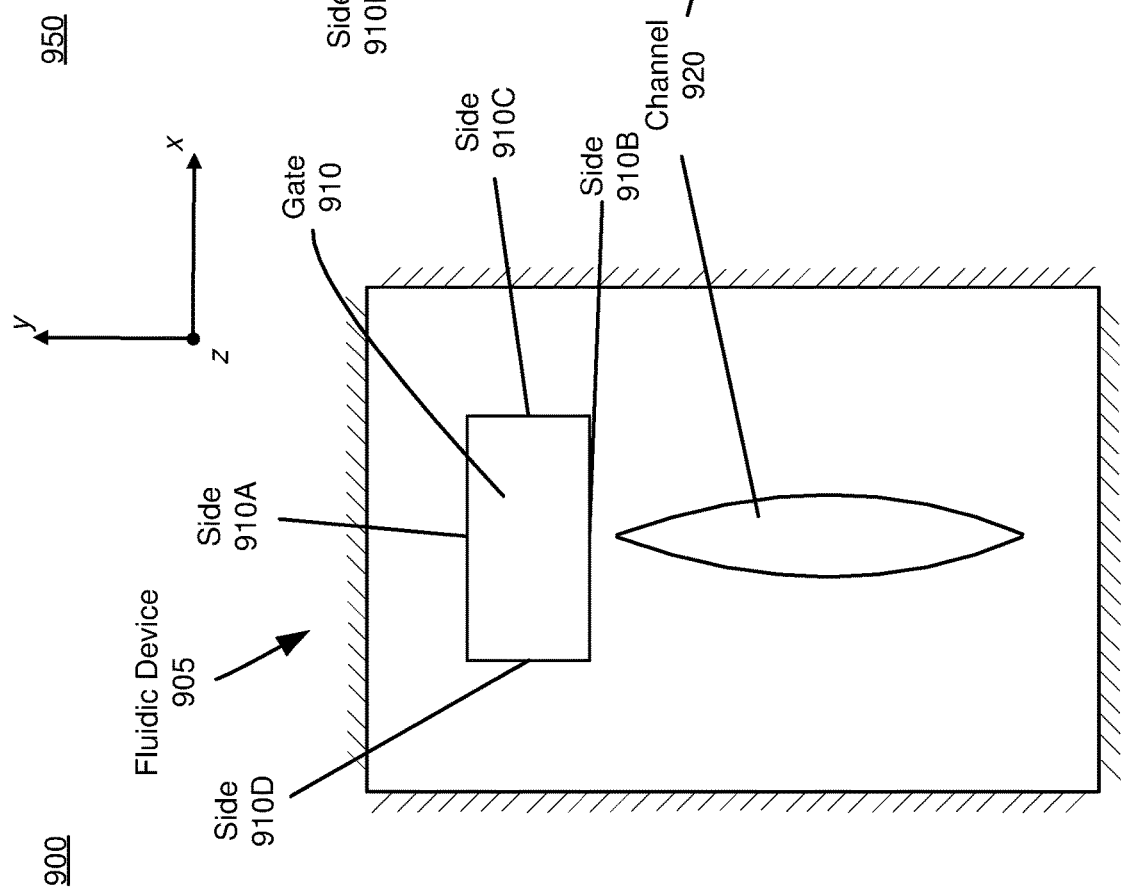
FIG. 9A is a cross section of the fluidic device including a gate and a NFET pinch tube channel, the gate at a low pressure state, in accordance with an embodiment.

FIG. 9A is a cross section 900 of the fluidic device 905 including a gate 910 and a NFET pinch tube channel 920, the gate 910 at a low pressure state, in accordance with an embodiment. The fluidic device 905 includes the gate 910, and a channel 920 that receives fluid flowing from a source (not shown) and outputs the fluid to a drain (not shown). In some embodiments, the fluidic device 905 is the fluidic device 130A or 130B shown in FIG. 1. In one embodiment, the source, the drain, and the gate 910 function analogous to the source, drain and gate in a field effect transistor in an electrical system.

The channel 920 is a structure that connects two ends that are referred to as the source and the drain, and the channel 920 is filled with a fluid (e.g., liquid or gas). In one embodiment, the channel 920 can be a flexible tube filled with fluid. The channel 920 may have different types of shapes, sizes and/or be made from different materials. In the embodiments depicted in FIGS. 9A and 9B, the cross section of the channel 920 is shaped like a cat-eye such that when the channel 920 is deformed by pressure from the gate 910 as shown in FIG. 9B, the whole channel 920 may be squeezed to completely cut off the fluid flow inside the channel 920, allowing a full closure of the channel 920. In alternative embodiments, the cross section of the channel 920 may be circular, elliptical, square, rectangular, etc. The channel 920 is made of materials such that the channel 920 is flexible. For example, the channel 920 may be composed of materials such as silicone (a type of elastomer), plastic, etc., and example materials used are polymers such as PDMS. The size can range from 50 um to 5 mm. In some embodiments, an end of the channel 920 that is furthest from the gate 910 is fixed in place such that the end of the channel 920 experiences minimal displacement when pressure is placed on the channel 920 by the gate 910 as described in greater detail below.

The gate 910 is a part of the fluidic device 905 and functions analogous to a gate of an electronic transistor in an electrical system. As seen in FIGS. 9A and 9B, the gate 910 has sides 910A, 910B, 910C, and 910D is located above the channel 920. The gate 910 may be inflated by input of fluid and/or deflated by output of fluid. For simplicity, the input and output of the gate 910 are not shown in FIGS. 9A and 9B. In some embodiments, the input to the gate 910 may be from some other fluidic device. Likewise, in some embodiments, the output of the gate 910 may be coupled to other fluidic devices. The gate 910 may have different shapes, sizes and/or may be made from different materials. As one example, the cross section of the gate 910 may be circular, elliptical, square, rectangular, etc. In some embodiments, the gate 910 is made of a flexible and extensible material such that the gate 910 may be inflated by increasing the pressure of fluid within the gate 910. Similarly, the gate 910 may be deflated by decreasing the pressure of fluid within the gate 910. In further embodiments, the gate 910 may be configured such that the gate 910 is biased to expand in a certain direction when filled with fluid. For example, in the embodiment shown in FIGS. 9A and 9B, the gate 910 may be configured such that when fluid pressure within the gate 910 is increased, the gate 910 expands primarily toward the channel 920. To accomplish this bias in the gate 910, sides of the gate 910 opposite the channel 920 may be non-extensible. For example, the sides 910A, 910C, and 910D may be non-extensible in order to bias the gate 910 to expand in the direction of the channel 920.

As shown in FIG. 9A, while the gate 910 is in a low pressure state, it is deflated. As a result, the gate 910 exerts little pressure on the channel 920, and the channel 920 is narrow such that that flow through the channel 920 is at a closed threshold rate and that the fluidic device 905 is in an "OFF" condition.

FIG. 9B is a cross section 950 of the fluidic device 905 shown in FIG. 9A with the gate 910 at a high pressure state, in accordance with an embodiment. In FIG. 9B, the fluid pressure within the gate 910 is such that the gate 910 has inflated to exert pressure on channel 920. The pressure exerted on the channel 920 causes the channel 920 to expand laterally, effectively causing the channel 920 to widen until the channel 920 is at least partially opened such that that flow through the channel 920 is at an open threshold rate and that the fluidic device 905 is in an "ON" condition.

The fluidic device 905 transits from a closed state (FIG. 9A) to an open state (FIG. 9B) by increasing fluid pressure at the gate 910. During a transitionary period (not shown), the gate 910 expands (with increasing pressure), pushing the gate 910 further into the channel 920, and the channel 920 is opened such that the rate of fluid flow through the channel 920 is increased. When the fluid flow reaches an open threshold value, the fluidic device 905 is in an "ON" condition.

In alternative embodiments not shown in FIG. 9A-9B, the gate 910 may not have a flexible shape that can expand or shrink with the different pressure applied within the gate 910. In this case, instead of expanding towards the channel 920 to open the channel 920, extra pressure from outside the gate 910 may be applied to the gate 910 to make the gate 910 move toward the channel 920, causing the channel 920 to open. For example, co-casted materials may be placed around the gate 910 such that the gate 910 substantially deforms only in the direction of the channel 920. Co-casted materials and their use in fluidic devices is further described in U.S. Provisional Patent Application No. 62/399,153, filed on Sep. 23, 2016, which is hereby incorporated by reference in its entirety.

FIG. 10A is a cross section 1000 of a fluidic device 1005 including a gate 1010 and an area valve 1015, the gate 1010 at a low pressure state, in accordance with an embodiment. The fluidic device 1005 includes the gate 1010, and a channel 1020 that receives fluid flowing from a source 1030 and outputs the fluid to a drain 1040. The fluidic device 1005 also includes the area valve 1015 that works in combination with the gate 1010 to regulate fluid flow through the channel 1020, as described in greater detail below. In some embodiments, the fluidic device 1005 is the fluidic device 130A or 130B shown in FIG. 1. In one embodiment, the source 1030, the drain 1040 and the gate 1010 function analogous to the source, drain and gate in a field effect transistor in an electrical system.

The channel 1020 is a structure that connects two ends that are referred to as the source 1030 and the drain 1040, and the channel 1020 is filled with a fluid (e.g., liquid or gas). In one embodiment, the channel 1020 can be a flexible tube filled with fluid. The channel 1020 may have different types of shapes, sizes and/or be made from different materials. As one example, the cross section of the channel 1020 may be circular, elliptical, square, rectangular, or any combination thereof. The channel 1020 may be composed of materials such as silicone (a type of elastomer), plastic, etc., and example materials used are polymers such as PDMS. The size can range from 50 um to 5 mm.

The area valve 1015 is positioned within the channel 1020 between the source 1030 and the drain 1040 such that the area valve 1015 at least partially obstructs fluid flow between the source 1030 and the drain 1040. The area valve 1015 may have different types of shapes, sizes and/or be made from different materials. As one example, the cross section of the area valve 1015 may be circular, elliptical, square, rectangular, or any combination thereof.

The area valve 1015 comprises three portions: a valve portion 1025, a coupling portion 1035, and an interface portion 1045. The interface portion 1045 of the area valve 1015 is located outside of the channel 1020. The interface portion 1045 of the area valve 1015 fits within an opening of the channel 1020 such that fluid within the channel 1020 is unable to escape through the opening. The interface portion 1045 of the area valve 1015 receives pressure from the gate 1010, as described in greater detail below.

The coupling portion 1035 of the area valve 1015 couples the interface portion 1045 to the valve portion 1025. Specifically, the relatively small area of the coupling portion 1035 compared to the interface portion 1045 allows the pressure that is applied to the interface portion 1045 by the gate 1010 to be concentrated and transferred to the valve portion 1025. This allows the valve portion 1025 to move contrary to fluid pressure in the channel 1020, as described in greater detail below.

The valve portion 1025 of the area valve 1015 protrudes into the channel 1010. Using pressure transferred from the gate 1010, to the interface portion 1045, to the coupling portion 1035, and finally to the valve portion 1025, the area valve 1015 is able to translate vertically within the opening of the channel 1020, contrary to fluid pressure in the channel 1020, such that the distance that the valve portion 1025 of the area valve 1015 protrudes into the channel 1020 can be increased or decreased. The valve portion 1025 of the area valve 1015 is shaped such that at one or more distances by which the area valve 1015 protrudes into the channel 1020, the valve portion 1025 of the area valve 1015 blocks the channel 1020 such that that fluid flow from the source 1030 to the drain 1040 is at a closed threshold rate and the fluidic device 1005 is in an "OFF" condition. Conversely, the valve portion 1025 of the area valve 1015 is also shaped such that at one or more alternate distances by which the area valve 1015 protrudes into the channel 1020, the valve portion 1025 of the area valve 1015 unblocks the channel 1020 such that that flow from the source 1030 to the drain 1040 is at an open threshold rate and the fluidic device 1005 is in an "ON" condition.

The gate 1010 is a part of the fluidic device 1005 and functions analogous to a gate of an electronic transistor in an electrical system. The gate 1010 is located outside of the opening of the channel 1020 and is located directly above the interface portion 1045 of the area valve 1015. The gate 1010 may be inflated by input of fluid and/or may be deflated by output of fluid. For simplicity, the input and output of the gate 1010 are not shown in FIGS. 10A and 10B. In some embodiments, the input to the gate 1010 may be from some other fluidic device. Likewise, in some embodiments, the output of the gate 1010 may be coupled to other fluidic devices. The gate 1010 may have different shapes, sizes and/or may be made from different materials. As one example, the cross section of the gate 1010 may be circular, elliptical, square, rectangular, etc. In some embodiments, the gate 1010 is made of a flexible and extensible material such that the gate 1010 may be inflated by increasing the pressure of fluid within the gate 1010. Similarly, the gate 1010 may be deflated by decreasing the pressure of fluid within the gate 1010.

As shown in FIG. 10A, while the gate 1010 is in a low pressure state, it is deflated. As a result, the valve portion 1025 of the area valve 1015 protrudes into the channel 1020 by a distance at which the channel 1020 is at least partially blocked by the area valve 1015 such that that flow from the source 1030 to the drain 1040 is at a closed threshold rate and that the fluidic device 1005 is in an "OFF" condition.

FIG. 10B is a cross section 1050 of the fluidic device 1005 shown in FIG. 10A with the gate 1010 at a high pressure state, in accordance with an embodiment. In FIG. 10B, the fluid pressure within the gate 1010 is such that the gate 1010 has inflated to exert pressure on the interface portion 1045 of the area valve 1015. This pressure is transferred from the relatively large interface portion 1045 to the relatively small coupling portion 1035 and valve portion 1025, effectively concentrating the pressure and displacing the valve portion 1025 of the area valve 1015 further into the channel 1020. By pushing the valve portion 1025 of the area valve 1015 further into the channel 1020, the valve portion 1025 protrudes into the channel 1020 by a distance at which the channel 1020 is at least partially un-blocked by the valve portion 1025 such that that flow from the source 1030 to the drain 1040 is at an open threshold rate and that the fluidic device 1005 is in an "ON" condition.

The fluidic device 1005 transits from a closed state (FIG. 10A) to an open state (FIG. 10B) by increasing fluid pressure at the gate 1010. During a transitionary period (not shown), the gate 1010 expands (with increasing pressure) to push the area valve 1015 further into the channel 1020, and the channel 1020 is unblocked such that the rate of fluid flow from the source 1030 to the drain 1040 is increased. When the fluid flow reaches an open threshold value, the fluidic device 1005 is in an "ON" condition.

In alternative embodiments not shown in FIG. 10A-10B, the gate 1010 may not have a flexible shape that can expand or shrink with the different pressure applied within the gate 1010. In this case, instead of expanding towards the interface portion 1045 of the area valve 1015 to open the channel 1020, extra pressure from outside the gate 1010 may be applied to the gate 1010 to make the gate 1010 move toward the interface portion 1045 of the area valve 1015, causing the channel 1020 to be opened. For example, co-casted materials may be placed around the gate 1010 such that the gate 1010 substantially deform only in the direction of the interface portion 1045 of the area valve 1015. Co-casted materials and their use in fluidic devices is further described in U.S. Provisional Patent Application No. 62/399,153, filed on Sep. 23, 2016, which is hereby incorporated by reference in its entirety.

Figure 11A:
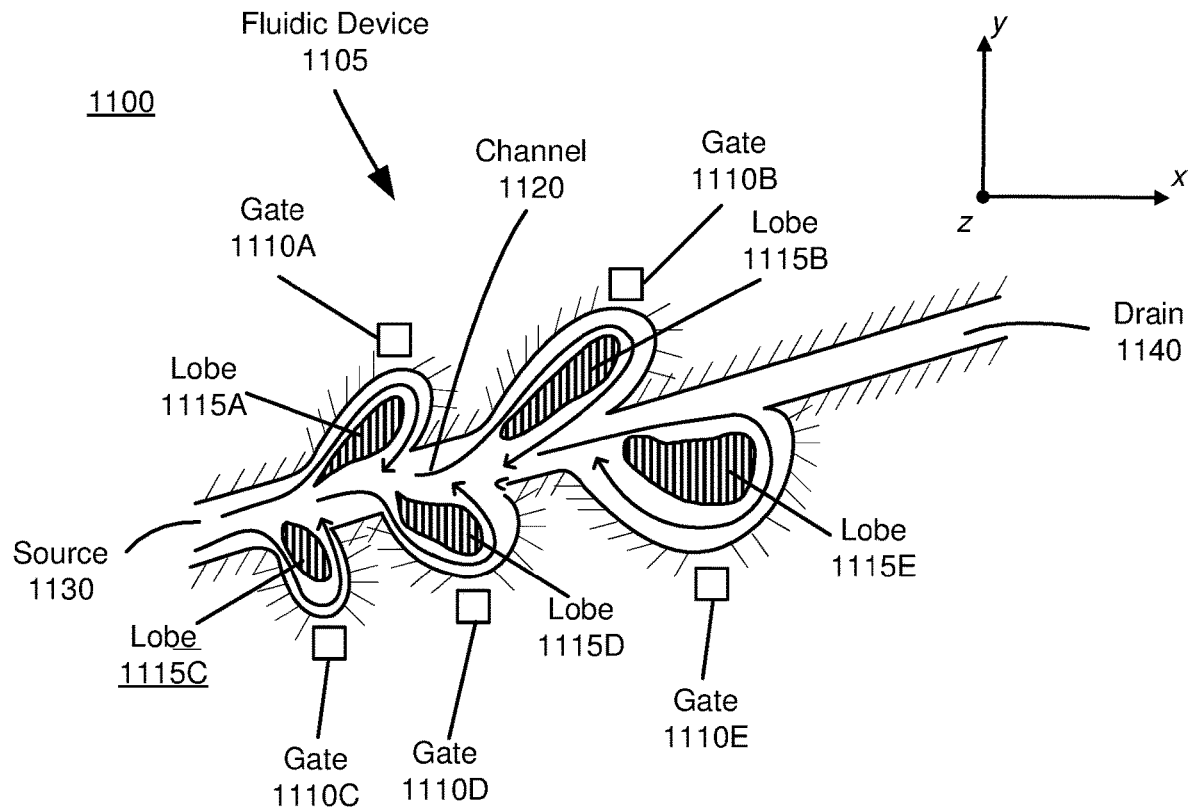
FIG. 11A is a cross section of a fluidic device including a plurality of NFET tesla gates at a low pressure state, in accordance with an embodiment.

FIG. 11A is a cross section 1100 of a fluidic device 1105 including a plurality of NFET tesla gates 1110A, 1110B, 1110C, 1110D, and 1110E at a low pressure state, in accordance with an embodiment. The fluidic device 1105 includes a channel 1120 that receives fluid flowing from a source 1130 and outputs the fluid to a drain 1140. The fluidic device 1105 also includes lobes 1115A-E that are offshoots of the channel 1120. Fluid from the channel 1120 may travel around the lobes 1115A-E and back into the channel 1120. Each lobe 1115A-E is associated with at least one of the gates 1110A-E. The gates 1110A-E serve to restrict fluid flow around the lobes 1115A-E. In some embodiments, the fluidic device 1105 is the fluidic device 130A or 130B shown in FIG. 1. In one embodiment, the source 1130, the drain 1140 and the gates 1110A-E function analogous to the source, drain and gates in a field effect transistor in an electrical system.

The channel 1120 is a structure that connects two ends that are referred to as the source 1130 and the drain 1140, and the channel 1120 is filled with a fluid (e.g., liquid or gas). In one embodiment, the channel 1120 can be a flexible tube filled with fluid. The channel 1120 may have different types of shapes, sizes and/or be made from different materials. As one example, the cross section of the channel 1120 may be circular, elliptical, square, rectangular, etc. The channel 1120 may be composed of materials such as silicone (a type of elastomer), plastic, etc., and example materials used are polymers such as PDMS. The size can range from 50 um to 5 mm.

As described above, the lobes 1115A-E are offshoots of the channel 1120. Each lobe 1115A-E comprises a solid core (designated by the striped pattern in FIGS. 11A and 11B) and a pathway that allows fluid to flow from the channel 1120, around the solid core of the lobes 1115A-E, and back into the channel 1120. The lobes 1115A-E may have different types of shapes, sizes and/or be made from different materials. As one example, the cross section of the lobes 1115A-E may be circular, elliptical, square, rectangular, etc. The lobes 1115A-E may be composed of materials such as silicone (a type of elastomer), plastic, etc., and example materials used are polymers such as PDMS. The lobes 1115A-E may be placed in different planes of the fluidic device 1105.

Each lobe 1115A-E is associated with at least one gate 1110A-E. The gates 1110A-E function analogous to gates of an electronic transistor in an electrical system. The gates 1110A-E may be inflated by input of fluid and/or may be deflated by output of fluid. For simplicity, the input and output of the gates 1110A-E are not shown in FIGS. 11A and 11B. In some embodiments, the input to the gates 1110A-E may be from some other fluidic device. Likewise, in some embodiments, the output of the gates 1110A-E may be coupled to other fluidic devices. The gates 1110A-E may have different types of shapes, sizes and/or be made from different materials. As one example, the cross section of the gates 1110A-E may be circular, elliptical, square, rectangular, etc. In some embodiments, the gates 1110A-E are made of a flexible and extensible material such that the gates 1110A-E may be inflated by increasing the pressure of fluid within the gate 1110A-E. Similarly, the gates 1110A-E may be deflated by decreasing the pressure of fluid within the gates 1110A-E. As noted above, the gates 1110A-E are located in proximity to the lobes 1115A-E such that the gates 1110A-E can control the rate of fluid flow around the lobes 1115A-E by compressing the pathways around the lobes 1115A-E through which fluid can travel.

As shown in FIG. 11A, while the gates 1110A-E are in a low pressure state, they do not exert pressure on the lobes 1115A-E. As a result, fluid is able to travel from the channel 1120 into the pathways surrounding the lobes 1115A-E, and circulate around the lobes 1115A-E before re-entering the channel 1120. Because of the angle at which the lobes 1115A-E are positioned with respect to the channel 1120, fluid that re-enters the channel 1120 after circulating around the lobes 1115A-E is directed towards the source 1130, rather than towards the drain 1140 as it was prior to circling the lobes 1115A-E. This recirculation of fluid hinders fluid flow through the channel 1120 such that flow from the source 1130 to the drain 1140 is at a closed threshold rate such that the fluidic device 1105 is in an "OFF" condition. Note that a relatively small amount of fluid may avoid recirculation and flow from the source 1130 to the drain 1140, but this amount of fluid is negligible compared to the amount of fluid that circles around the lobes 1115A-E.

Figure 11B:
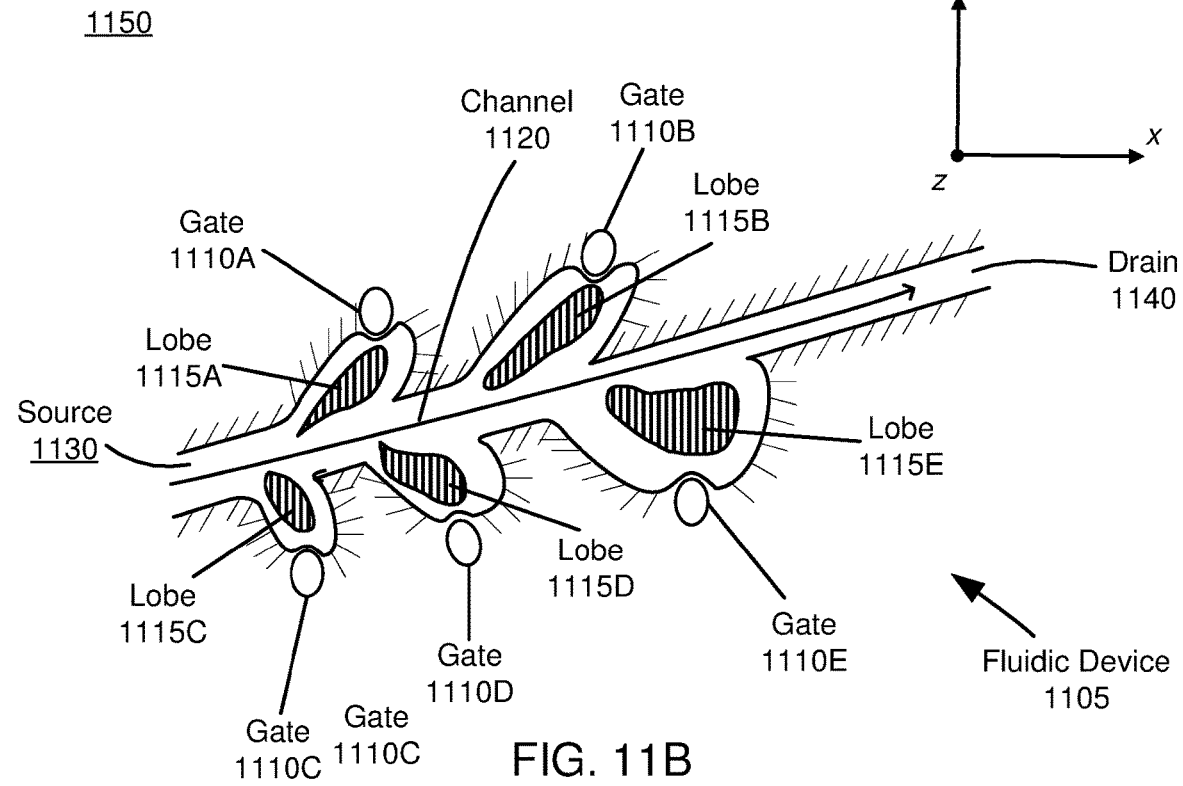
FIG. 11B is a cross section of the fluidic device shown in FIG. 11A with the gates at a high pressure state, in accordance with an embodiment.

FIG. 11B is a cross section 1150 of the fluidic device 1105 shown in FIG. 11A with the gates 1110A-E at a high pressure state, in accordance with an embodiment. In FIG. 11B, the fluid pressure within the gates 1110A-E is such that the gates 1110A-E have inflated to exert pressure on the lobes 1115A-E, effectively pinching the pathways around the lobes 1115A-E such that minimal fluid is able to circle the lobes 1115A-E. By prohibiting this circulation of fluid around the lobes 1115A-E, back flow of fluid in the direction of the source 1130 is minimized, and fluid can flow with little resistance from the source 1130 directly through the channel 1120 to the drain 1140 at an open threshold rate such that the fluidic device 1105 is in an "ON" condition.

The fluidic device 1105 transits from a closed state (FIG. 11A) to an open state (FIG. 11B) by increasing fluid pressure at the gates 1110A-E. During a transitionary period (not shown), the gates 1110A-E gradually expand (with increasing pressure) to pinch the lobes 1115A-E, and circulation of fluid around the lobes 1115A-E is gradually decreased and such that the rate of fluid flow from the source 1130 to the drain 1140 is gradually increased. When the fluid flow reaches an open threshold value, the fluidic device 1105 is in an "ON" condition.

In alternative embodiments not shown in FIGS. 11A and 11B, the gates 1110A-E may not have a flexible shape that can expand or shrink with the different pressure applied within the gates 1110A-E. In this case, instead of expanding to deform the lobes 1115A-E such that fluid is unable to circulate around the lobes 1115A-E, extra pressure from outside the gates 1110A-E may be applied to the gates 1110A-E to make the gates 1110A-E move toward the lobes 1115A-E so that the lobes 1115A-E are deformed such that fluid is unable to circulate around the lobes 1115A-E and thus is directed through the channel 1120 towards the drain 1140. For example, co-casted materials may be placed around the gates 1110A-E such that the gates 1110A-E substantially deform only in the direction of the lobes 1115A-E. Co-casted materials and their use in fluidic devices is further described in U.S. Provisional Patent Application No. 62/399,153, filed on Sep. 23, 2016, which is hereby incorporated by reference in its entirety.

Figure 12A:
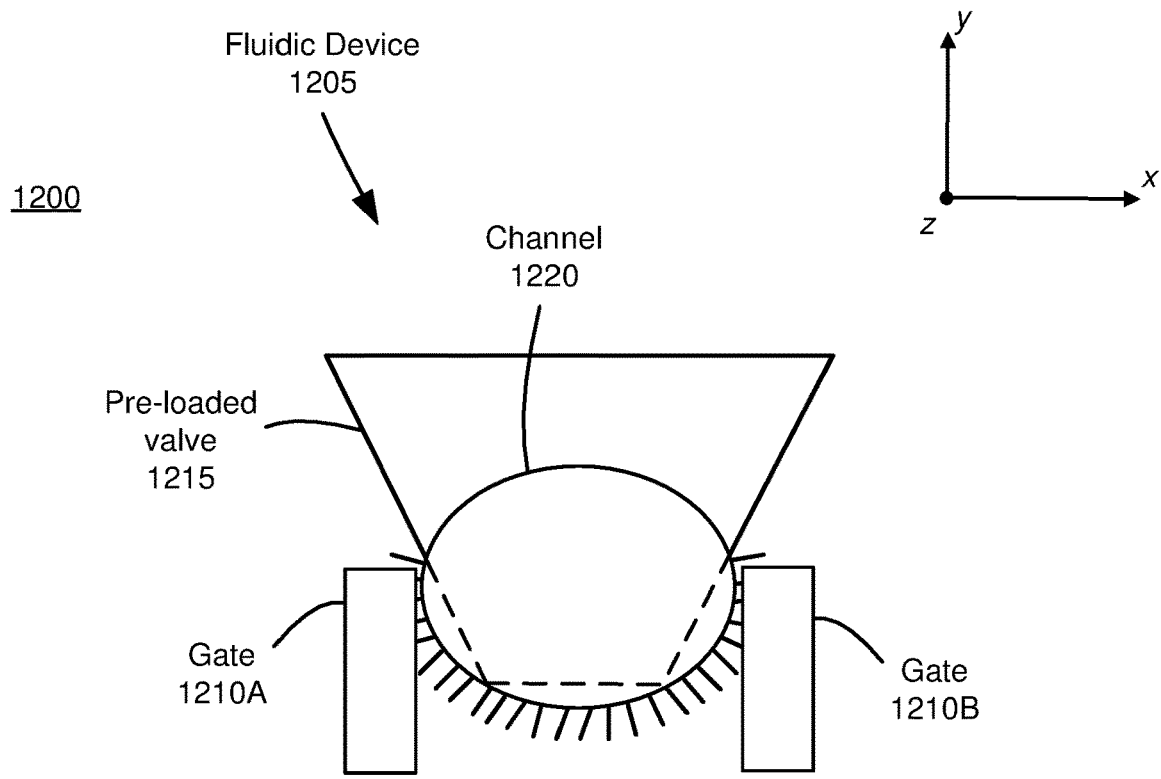
FIG. 12A is a cross section of a fluidic device including gates and a pre-loaded NFET valve, the gates at a low pressure state, in accordance with an embodiment.

FIG. 12A is a cross section 1200 of a fluidic device 1205 including gates 1210A and 1210B and a pre-loaded NFET valve 1215, the gates 1210A and 1210B at a low pressure state, in accordance with an embodiment. The fluidic device 1205 includes the gates 1210A and 1210B, and a channel 1220 that receives fluid flowing from a source (not shown) and outputs the fluid to a drain (not shown). The fluidic device 1205 also includes the pre-loaded valve 1215. The gates 1210A and 1210B serve to displace the pre-loaded valve 1215 such that the pre-loaded valve 1215 is able to regulate fluid flow through the channel 1220. In some embodiments, the fluidic device 1205 is the fluidic device 130A or 130B shown in FIG. 1. In one embodiment, the source, the drain, and the gates 1210A and 1210B function analogous to the source, drain, and gates in a field effect transistor in an electrical system.

The channel 1220 is a structure that connects two ends that are referred to as the source and the drain, and the channel 1220 is filled with a fluid (e.g., liquid or gas). In one embodiment, the channel 1220 can be a flexible tube filled with fluid. The channel 1220 may have different types of shapes, sizes and/or be made from different materials. As one example, the cross section of the channel 1220 may be circular, elliptical, square, rectangular, etc. The channel 1220 may be composed of materials such as silicone (a type of elastomer), plastic, etc., and example materials used are polymers such as PDMS. The size can range from 50 um to 5 mm.

The pre-loaded valve 1215 is positioned within the channel 1220 between the source 1230 and the drain 1240 such that the pre-loaded valve 1215 at least partially obstructs (and in some embodiments completely blocks) fluid flow between the source 1230 and the drain 1240. Specifically, the pre-loaded valve 1215 protrudes through an opening of the channel 1220, into the channel 1220. The pre-loaded valve 1215 is able to translate along the x-axis within the opening of the channel 1220 such that the distance that the pre-loaded valve 1215 protrudes into the channel 1220 can be increased or decreased. The pre-loaded valve 1215 fits within the opening of the channel 1220 such that fluid within the channel 1220 is unable to escape through the opening. The pre-loaded valve 1215 may have different types of shapes, sizes and/or be made from different materials. In the embodiments depicted in FIGS. 12A and 12B, the cross-section of the pre-loaded valve 1215 is a trapezoid. In alternative embodiments, the cross section of the pre-loaded valve 1215 may be circular, elliptical, square, rectangular, or any combination thereof.

The gates 1210A and 1210B are a part of the fluidic device 1205 and function analogous to gates of an electronic transistor in an electrical system. The gates 1210A and 1210B are located outside of the channel 1220 on either lateral side of the channel 1220. The gates 1210A and 1210B are also located such that at least a portion of each of the gates 1210A and 1210B is located directly beneath at least a portion of the pre-loaded valve 1215. Thus the location of the gates 1220 may depend on the shape and dimensions of the pre-loaded valve 1215. Each gate 1210A and 1210B may be inflated by input of fluid and/or may be deflated by output of fluid. For simplicity, the input and output of the gates 1210A and 1210B are not shown in FIG. 12A. In some embodiments, the input to the gates 1210A and 1210B may be from some other fluidic device. Likewise, in some embodiments, the output of the gates 1210A and 1210B may be coupled to other fluidic devices. The gates 1210A and 1210B may have different shapes, sizes and/or may be made from different materials. As one example, the cross section of the gates 1210A and 1210B may be circular, elliptical, square, rectangular, etc. In some embodiments, the gates 1210A and 1210B are made of a flexible and extensible material such that the gates 1210A and 1210B may be inflated by increasing the pressure of fluid within the gates 1210A and 1210B. Similarly, the gates 1210A and 1210B may be deflated by decreasing the pressure of fluid within the gates 1210A and 1210B. In certain embodiments, expansion of the gates 1210A and 1210B may be restricted on one or more sides of the gates 1210A and 1210B to promote expansion of the gates 1210A and 1210B in a specific direction. For example in one embodiment, expansion of the gates 1210A and 1210B may be restricted on certain sides such that the gates 1210A and 1210B preferentially expand along the x-axis in the direction of the pre-loaded valve 1215, rather than laterally.

As shown in FIG. 12A, while the gates 1210A and 1210B are in a low pressure state, they are deflated. As a result, the pre-loaded valve 1215 protrudes into the channel 1220 such that fluid flow through the channel 1220 is at a closed threshold rate such that the fluidic device 1205 is in an "OFF" condition.

Figure 12B:
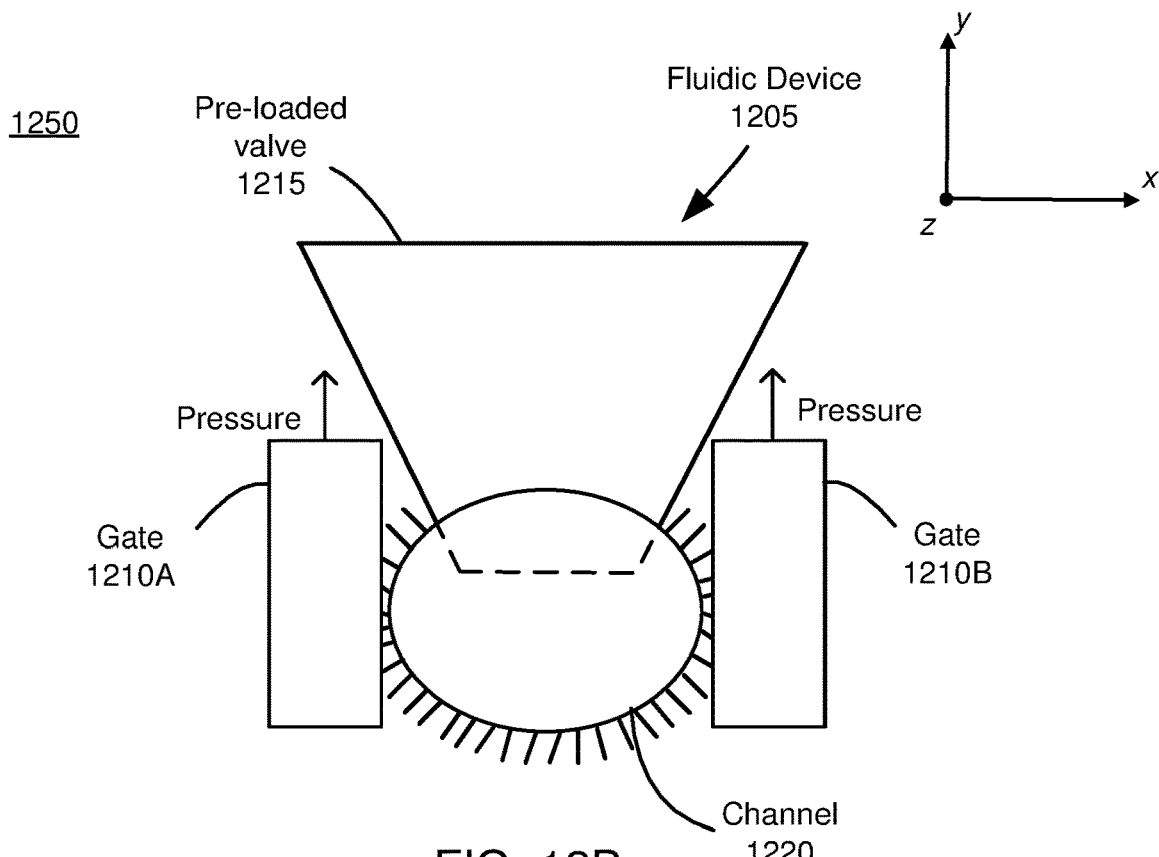
FIG. 12B is a cross section of the fluidic device shown in FIG. 12A with the gates at a high pressure state, in accordance with an embodiment.

FIG. 12B is a cross section 1250 of the fluidic device 1205 shown in FIG. 12A with the gates 1210A and 1210B at a high pressure state, in accordance with an embodiment. In FIG. 12B, the fluid pressure within the gates 1210A and 1210B is such that the gates 1210A and 1210B have inflated to exert pressure on the pre-loaded valve 1215, effectively lifting the pre-loaded valve 1215 at least partially out of the channel 1220 such that the distance that the pre-loaded valve 1215 protrudes into the channel 1220 is decreased. This lifting of the pre-loaded valve 1215 out of the channel 1220 creates a path for fluid flow through the channel 1220 and increases the flow rate in the channel 1220 to an open threshold rate such that the fluidic device 1205 is in an "ON" condition.

The fluidic device 1205 transits from a closed state (FIG. 12A) to an open state (FIG. 12B) by increasing fluid pressure at the gates 1210A and 1210B. During a transitionary period (not shown), the gates 1210A and 1210B gradually expand (with increasing pressure) to lift the pre-loaded valve 1215 at least partially out of the channel 1220, and the channel 1220 is gradually unblocked such that the rate of fluid flow through the channel 1220 is gradually increased. When the fluid flow reaches an open threshold value, the fluidic device 1205 is in an "ON" condition.

In alternative embodiments not shown in FIG. 12A-12B, the gates 1210A and 1210B may not have a flexible shape that can expand or shrink with the different fluid pressure applied within the gates 1210A and 1210B. In this case, instead of expanding to open the channel 1220, extra pressure from outside the gates 1210A and 1210B may be applied to the gates 1210A and 1210B to make the gates 1210A and 1210B move towards and lift the pre-loaded valve 1215, causing the channel 1220 to be opened. For example, co-casted materials may be placed around the gates 1210A and 1210B such that the gates 1210A and 1210B substantially deform only in the direction of the pre-loaded valve 1215. Co-casted materials and their use in fluidic devices is further described in U.S. Provisional Patent Application No. 62/399,153, filed on Sep. 23, 2016, which is hereby incorporated by reference in its entirety.

Figure 13B:
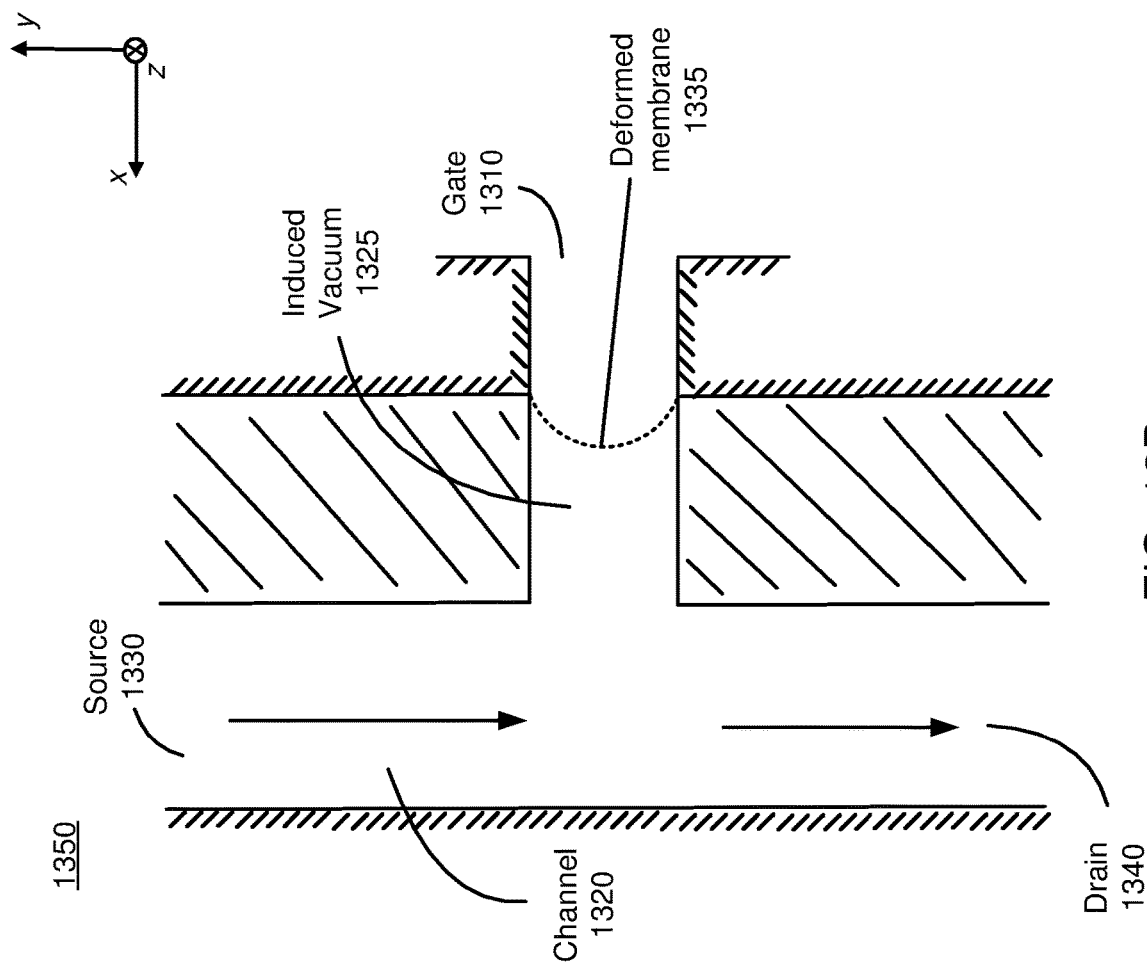
FIG. 13B is a cross section in the x-y plane of a region of the fluidic device of FIG. 13A, in accordance with an embodiment.
Figure 13A:
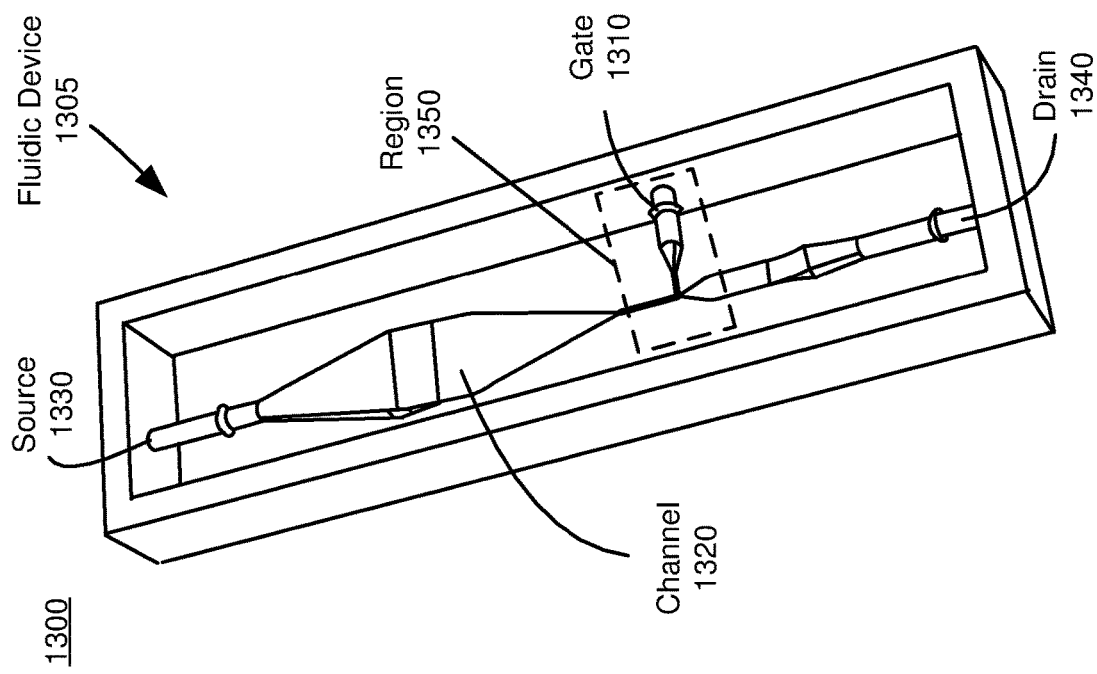
FIG. 13A is a drawing of a fluidic device, including a venturi gate 1310, in accordance with an embodiment.

FIG. 13A is a drawing of a fluidic device 1305, including a venturi gate 1310, in accordance with an embodiment. The fluidic device 1305 is configured to open and/or close the gate 1310, as more fully described below. In some embodiments, the gate 1310 may be coupled to other fluidic devices.

The fluidic device 1305 includes the gate 1310, and a channel 1320 that receives fluid flowing from a source 1330 and outputs the fluid to a drain 1340. In some embodiments, the fluidic device 1305 is the fluidic device 130A or 130B shown in FIG. 1. In one embodiment, the source 1330, the drain 1340 and the gate 1310 function analogous to the source, drain and gate in a field effect transistor in an electrical system.

The channel 1320 connects two ends that are referred to as the source 1330 and the drain 1340, and the channel 1320 is filled with a fluid (e.g., liquid or gas). The channel 1320 may have different types of shapes, sizes and/or be made from different materials. In certain embodiments, such as the embodiment depicted in FIG. 13A, the channel 1320 narrows significantly near the gate 1310. This narrowing of the channel 1320 near the gate 1310 creates a pressure differential to actuate the gate 1310 as described in greater detail below. The channel 1320 may be composed of materials such as silicone (a type of elastomer), plastic, etc., and example materials used are polymers such as PDMS. The size can range from 50 um to 5 mm.

The gate 1310 is a part of the fluidic device 1305 and functions analogous to a gate of an electronic transistor in an electrical system. As noted above, the gate 1310 may be coupled to other fluidic devices. The gate 1310 is positioned perpendicular to the channel 1320 such that in certain embodiments, fluid that flows through the channel 1320 does not enter the gate 1310.

FIG. 13B is a cross section in the x-y plane of the region 1350 of the fluidic device 1305 as indicated in FIG. 13A, in accordance with an embodiment. In FIG. 13B, fluid flows at a rapid rate from the source 1330 to the drain 1340 via the channel 1320. Note that the portion of the channel 1320 depicted in FIG. 13B is relatively narrow compared to other portions of the channel 1320, as seen more clearly in FIG. 13A. This narrowing of the channel 1320 in combination with the rapid rate of fluid flow through the channel 1320 increases the pressure within the channel 1320. This increased pressure in turn creates a relative pressure drop within the gate 1310 that is located perpendicular to the channel 1320. The relative drop in pressure then creates an induced vacuum 1325 within the gate 1310. The low pressure of the induced vacuum 1325 can be used in various ways to open and/or close the gate 1310. In some embodiments, such as the embodiment depicted in FIG. 13B, a membrane 1335 is located within the gate 1310. The low pressure of the induced vacuum 1325 may be used to deform the membrane 1335, and this membrane deformation may in turn open and/or close the gate 1310. In alternative embodiments, the low pressure of the induced vacuum 1325 may be used to cause the gate 1310 to rapidly expand, and this expansion may be used to open and/or close the gate 1310.

Figure 14:
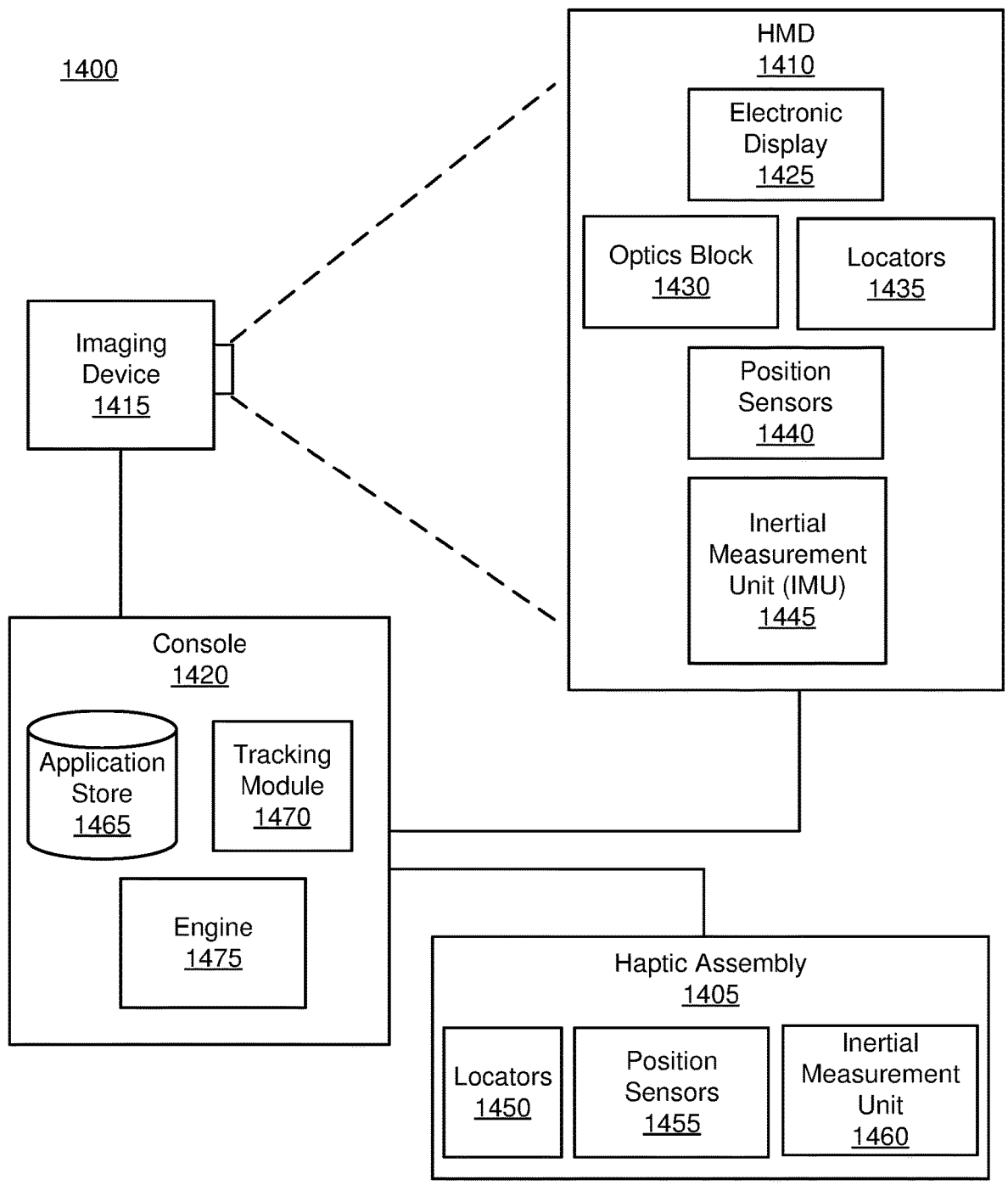
FIG. 14 is a block diagram of a head-mounted device (HMD) system, in accordance with one embodiment.

FIG. 14 is a block diagram of a head-mounted device (HMD) system 1400, in accordance with one embodiment. The system 1400 may be for use as a virtual reality (VR) system, an augmented reality (AR) system, a mixed reality (MR) system, or some combination thereof. The system 1400 may utilize one or more of the example fluidic devices depicted in FIGS. 3A-13B as further described below. The system 1400 shown by FIG. 14 comprises a HMD 1410, an imaging device 1415, and a haptic assembly 1405 that are each coupled to a console 1420. While FIG. 14 shows an example system 1400 including one HMD 1410, one imaging device 1415, and one haptic assembly 1405, in other embodiments any number of these components may be included in the system 1400. For example, there may be multiple HMDs 1410 each having an associated haptic assembly 1405 and being monitored by one or more imaging devices 1415, with each HMD 1410, haptic assembly 1405, and imaging devices 1415 communicating with the console 1420. In alternative configurations, different and/or additional components may be included in the system environment 1400. Additionally, in some embodiments the VR system 1400 may be modified to include other system environments, such as an AR system environment.

The HMD 1410 may act as a VR, AR, and/or a MR HMD. An MR and/or AR HMD augments views of a physical, real-world environment with computer-generated elements (e.g., images, video, sound, etc.). The HMD 1410 presents content to a user. Examples of media presented by the VR head set include one or more images, video, audio, or some combination thereof. In some embodiments, audio is presented via an external device (e.g., speakers and/or headphones) that receives audio information from the HMD 1410, the console 1420, or both, and presents audio data based on the audio information. The HMD 1410 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. The HMD 1410 includes an electronic display 1425, an optics block 1430, one or more locators 1435, one or more position sensors 1440, and an inertial measurement unit (IMU) 1445.

The electronic display 1425 displays 2D or 3D images to the user in accordance with data received from the console 1420. In various embodiments, the electronic display 1425 comprises a single electronic display element or multiple electronic displays (e.g., a display for each eye of a user). Examples of the electronic display element include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a waveguide display, some other display, or some combination thereof.

The optics block 1430 magnifies received light from the electronic display 1425, corrects optical errors associated with the image light, and the corrected image light is presented to a user of the HMD 1410. An optical element may be an aperture, a Fresnel lens, a convex lens, a concave lens, a filter, or any other suitable optical element that affects the image light emitted from the electronic display 1425. Moreover, the optics block 1430 may include combinations of different optical elements. In some embodiments, one or more of the optical elements in the optics block 1430 may have one or more coatings, such as anti-reflective coatings.

The locators 1435 are objects located in specific positions on the HMD 1410 relative to one another and relative to a specific reference point on the HMD 1410. A locator 1435 may be a light emitting diode (LED), a corner cube reflector, a reflective marker, a type of light source that contrasts with an environment in which the HMD 1410 operates, or some combination thereof. In embodiments where the locators 1435 are active (i.e., an LED or other type of light emitting device), the locators 1435 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 1435 are located beneath an outer surface of the HMD 1410, which is transparent to the wavelengths of light emitted or reflected by the locators 1435 or is thin enough to not substantially attenuate the wavelengths of light emitted or reflected by the locators 1435. Additionally, in some embodiments, the outer surface or other portions of the HMD 1410 are opaque in the visible band of wavelengths of light. Thus, the locators 1435 may emit light in the IR band under an outer surface that is transparent in the IR band but opaque in the visible band.

The IMU 1445 is an electronic device that generates fast calibration data based on measurement signals received from one or more of the position sensors 1440. A position sensor 1440 generates one or more measurement signals in response to motion of the HMD 1410. Examples of position sensors 1440 include: one or more accelerometers, one or more gyroscopes, one or more magnetometers, another suitable type of sensor that detects motion, a type of sensor used for error correction of the IMU 1445, or some combination thereof. The position sensors 1440 may be located external to the IMU 1445, internal to the IMU 1445, or some combination thereof.

Based on the one or more measurement signals from one or more position sensors 1440, the IMU 1445 generates fast calibration data indicating an estimated position of the HMD 1410 relative to an initial position of the HMD 1410. For example, the position sensors 1440 include multiple accelerometers to measure translational motion (forward/back, up/down, left/right) and multiple gyroscopes to measure rotational motion (e.g., pitch, yaw, roll). In some embodiments, the IMU 1445 rapidly samples the measurement signals and calculates the estimated position of the HMD 1410 from the sampled data. For example, the IMU 1445 integrates the measurement signals received from the accelerometers over time to estimate a velocity vector and integrates the velocity vector over time to determine an estimated position of a reference point on the HMD 1410. Alternatively, the IMU 1445 provides the sampled measurement signals to the console 1420, which determines the fast calibration data. The reference point is a point that may be used to describe the position of the HMD 1410. While the reference point may generally be defined as a point in space; however, in practice the reference point is defined as a point within the HMD 1410 (e.g., a center of the IMU 1445).

The IMU 1445 receives one or more calibration parameters from the console 1420. As further discussed below, the one or more calibration parameters are used to maintain tracking of the HMD 1410. Based on a received calibration parameter, the IMU 1445 may adjust one or more IMU parameters (e.g., sample rate). In some embodiments, certain calibration parameters cause the IMU 1445 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 1415 generates slow calibration data in accordance with calibration parameters received from the console 1420. Slow calibration data includes one or more images showing observed positions of the locators 1435 that are detectable by the imaging device 1415. The imaging device 1415 may include one or more cameras, one or more video cameras, any other device capable of capturing images including one or more of the locators 1435, or some combination thereof. Additionally, the imaging device 1415 may include one or more filters (e.g., used to increase signal to noise ratio). The imaging device 1415 is designed to detect light emitted or reflected from locators 1435 in a field of view of the imaging device 1415. In embodiments where the locators 1435 include passive elements (e.g., a retroreflector), the imaging device 1415 may include a light source that illuminates some or all of the locators 1435, which retroreflect the light towards the light source in the imaging device 1415. Slow calibration data is communicated from the imaging device 1415 to the console 1420, and the imaging device 1415 receives one or more calibration parameters from the console 1420 to adjust one or more imaging parameters (e.g., focal length, focus, frame rate, ISO, sensor temperature, shutter speed, aperture, etc.).

The haptic assembly 1405 is a device that allows a user to send action requests to the console 1420. An action request is a request to perform a particular action. For example, an action request may be to start or end an application or to perform a particular action within the application. The haptic assembly 1405 also provides haptic feedback including a perception of contacting a virtual object. In one embodiment, the haptic assembly 1405 includes a plurality of composable fluidic devices, such as the fluidic devices depicted in FIGS. 3A-13B, which may form one or more composite fluidic devices. The composite fluidic devices may be used to, e.g., address actuators included in the haptic assembly 1405 according to the haptic feedback signal from the console 1420. In one embodiment, as more fully described below in FIG. 15, the haptic assembly 1405 is a haptic glove 1500 through which the console 1420 enables a user to interact with a virtual object.

In FIG. 14, the haptic assembly 1405 further includes locators 1450, one or more position sensors 1455, and an inertial measurement unit (IMU) 1460. In some embodiments, the locators 1450, one or more position sensors 1455, an inertial measurement unit (IMU) 1460 are installed to determine a physical position or movement of the haptic assembly 1405. In addition, the haptic assembly 1405 receives, from the console 1420, a haptic feedback signal corresponding to haptic feedback to the user. The haptic assembly 1405 provides to the user with the haptic feedback of touching a virtual object in a virtual space, according to the haptic feedback signal. Specifically, the haptic assembly 1405 prevents or enables a physical movement of a portion of a user in contact with the virtual object in the virtual space. For example, if a user's finger is in contact with a virtual object (e.g., a virtual wall) in a virtual space, the haptic assembly 1405 prevents a physical movement of the user finger to move in a direction through the virtual object in the virtual space. Accordingly, the user can receive a perception of contacting the virtual object.

In one embodiment, the haptic feedback signal indicates a position or a portion of the haptic assembly 1405 to be actuated, and an amount of actuation of the position or the portion of the haptic assembly 1405 for providing haptic feedback. In this embodiment, the amount of actuation is determined by, e.g., the console 1420, according to a virtual position of the haptic assembly 1405 corresponding to a physical position of the haptic assembly 1405 and a virtual position of a virtual object in a virtual space. The haptic assembly 1405 provides tactile perception of a user touching the virtual object according to the amount of actuation indicated by the haptic feedback signal.

The locators 1450 are objects located in specific positions on the haptic assembly 1405 relative to one another and relative to a specific reference point of the haptic assembly 1405 on the haptic assembly 1405. A locator 1450 is substantially similar to a locator 1435 except that a locator 1450 is part of the haptic assembly 1405. Additionally, in some embodiments, the outer surface or other portions of the haptic assembly 1405 are opaque in the visible band of wavelengths of light. Thus, the locators 1450 may emit light in the IR band under an outer surface that is transparent in the IR band but opaque in the visible band.

A position sensor 1455 generates one or more measurement signals in response to motion of the haptic assembly 1405. The position sensors 1455 are substantially similar to the positions sensors 1440, except that the position sensors 1455 are part of the haptic assembly 1405. The position sensors 1455 may be located external to the IMU 1460, internal to the IMU 1460, or some combination thereof.

Based on the one or more measurement signals from one or more position sensors 1455, the IMU 1460 generates fast calibration data of the haptic assembly 1405 indicating an estimated position of the haptic assembly 1405 relative to an initial position of the haptic assembly 1405. For example, the position sensors 1455 include multiple accelerometers to measure translational motion (forward/back, up/down, left/right) and multiple gyroscopes to measure rotational motion (e.g., pitch, yaw, roll) of the haptic assembly 1405. In some embodiments, the IMU 1460 rapidly samples the measurement signals and calculates the estimated position of the haptic assembly 1405 from the sampled data. For example, the IMU 1460 integrates the measurement signals received from the accelerometers over time to estimate a velocity vector and integrates the velocity vector over time to determine an estimated position of a reference point of the haptic assembly 1405. Alternatively, the IMU 1460 provides the sampled measurement signals to the console 1420, which determines the fast calibration data of the haptic assembly 1405. The reference point of the haptic assembly 1405 is a point that may be used to describe the position of the haptic assembly 1405. While the reference point of the haptic assembly 1405 may generally be defined as a point in space; however, in practice the reference point of the haptic assembly 1405 is defined as a point within the haptic assembly 1405 (e.g., a center of the IMU 1460).

The IMU 1460 receives one or more calibration parameters of the haptic assembly 1405 from the console 1420. As further discussed below, the one or more calibration parameters of the haptic assembly 1405 are used to maintain tracking of the haptic assembly 1405. Based on a received calibration parameter of the haptic assembly 1405, the IMU 1460 may adjust one or more IMU parameters (e.g., sample rate). In some embodiments, certain calibration parameters of the haptic assembly 1405 cause the IMU 1460 to update an initial position of the reference point of the haptic assembly 1405 so it corresponds to a next calibrated position of the reference point of the haptic assembly 1405. Updating the initial position of the reference point of the haptic assembly 1405 as the next calibrated position of the reference point of the haptic assembly 1405 helps reduce accumulated error associated with the determined estimated position.

The console 1420 provides media to the HMD 1410 for presentation to the user in accordance with information received from one or more of: the imaging device 1415, the HMD 1410, and the haptic assembly 1405. In the example shown in FIG. 14, the console 1420 includes an application store 1465, a tracking module 1470, and an engine 1475. Some embodiments of the console 1420 have different modules than those described in conjunction with FIG. 14. Similarly, the functions further described below may be distributed among components of the console 1420 in a different manner than is described here.

The application store 1465 stores one or more applications for execution by the console 1420. An application is a group of instructions, that when executed by a processor, generates content for presentation to the user. Content generated by an application may be in response to inputs received from the user via movement of the HMD 1410 or the haptic assembly 1405. Examples of applications include: gaming applications, conferencing applications, video playback application, or other suitable applications.

The tracking module 1470 calibrates the VR system 1460 using one or more calibration parameters and may adjust one or more calibration parameters to reduce error in determination of the position of the HMD 1410. For example, the tracking module 1470 adjusts the focus of the imaging device 1415 to obtain a more accurate position for observed locators on the HMD 1410. Moreover, calibration performed by the tracking module 1470 also accounts for information received from the IMU 1445. Additionally, if tracking of the HMD 1410 is lost (e.g., the imaging device 1415 loses line of sight of at least a threshold number of the locators 1435), the tracking module 1470 re-calibrates some or all of the system environment 1460.

The tracking module 1470 tracks movements of the HMD 1410 using slow calibration information from the imaging device 1415. The tracking module 1470 determines positions of a reference point of the HMD 1410 using observed locators from the slow calibration information and a model of the HMD 1410. The tracking module 1470 also determines positions of a reference point of the HMD 1410 using position information from the fast calibration information. Additionally, in some embodiments, the tracking module 1470 may use portions of the fast calibration information, the slow calibration information, or some combination thereof, to predict a future location of the headset 1410. The tracking module 1470 provides the estimated or predicted future position of the HMD 1410 to the engine 1475.

The engine 1475 executes applications within the system environment 1460 and receives position information, acceleration information, velocity information, predicted future positions, or some combination thereof of the HMD 1410 from the tracking module 1470. Based on the received information, the engine 1475 determines content to provide to the HMD 1410 for presentation to the user. For example, if the received information indicates that the user has looked to the left, the engine 1475 generates content for the HMD 1410 that mirrors the user's movement in a virtual environment. Additionally, the engine 1475 performs an action within an application executing on the console 1420 in response to an action request received from the haptic assembly 1405 and provides feedback to the user that the action was performed. The provided feedback may be visual or audible feedback via the HMD 1410 or haptic feedback via the haptic assembly 1405.

Figure 15:
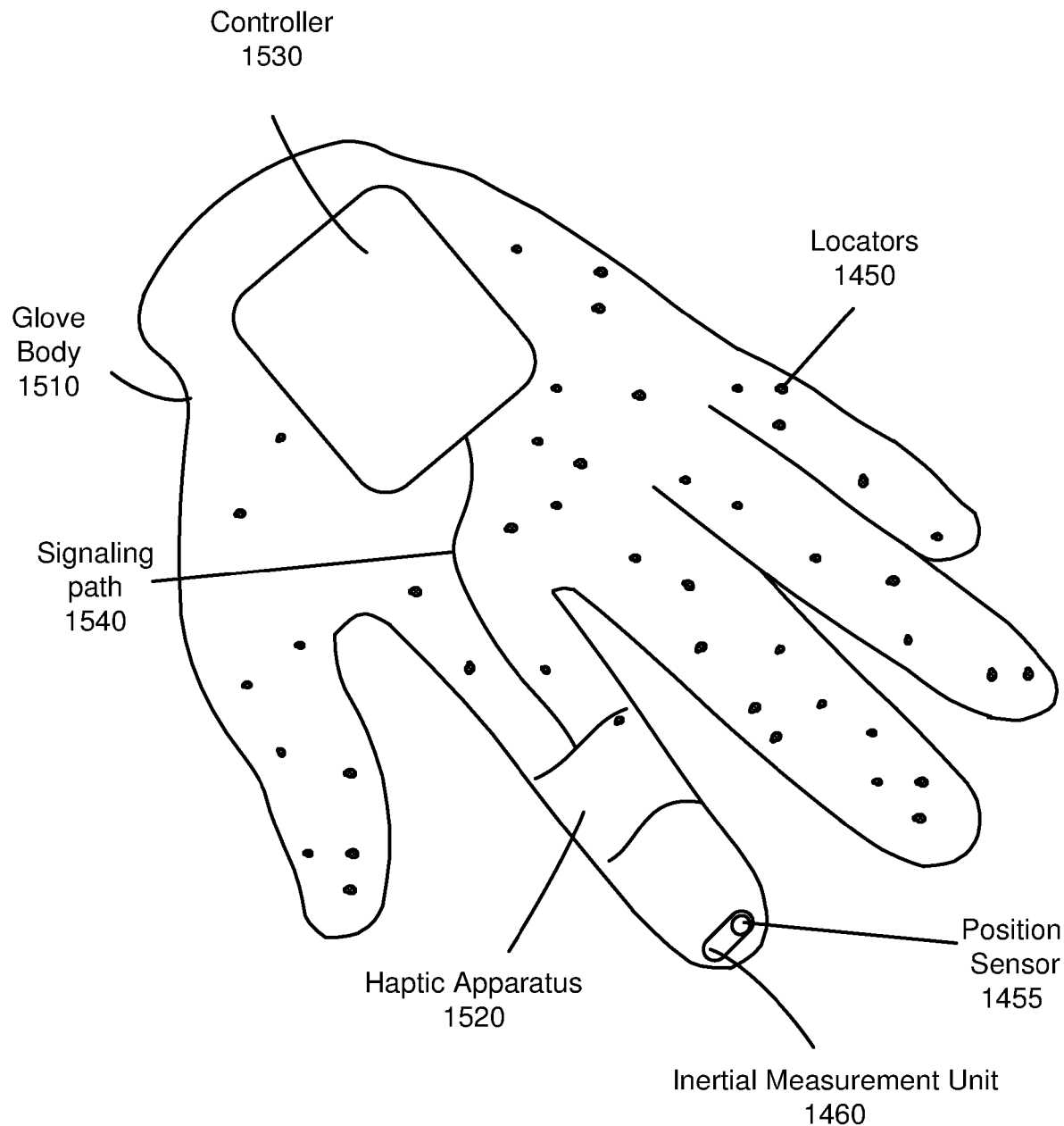
FIG. 15 is an example haptic glove for interacting with virtual objects, in accordance with an embodiment.

FIG. 15 is an example haptic glove 1500 for interacting with virtual objects, in accordance with an embodiment. The haptic glove 1500 shown in FIG. 15 includes a glove body 1510, a haptic apparatus 1520, a controller 1530, a signaling path 1540, one or more locators 1450, a position sensor 1455 and an IMU 1460. Only one signaling path 1540, one haptic apparatus 1520, one position sensor 1455 and one IMU 1460 are shown in FIG. 15 to simplify the description. In alternative embodiments not shown, the haptic glove 1500 can include multiple signaling paths, position sensors and haptic apparatus that are connected to the controller 1530, for example, for each finger of the haptic glove 1500, a set of haptic apparatus, position sensors and IMUs may be connected to the controller. Likewise, the functions performed by the various entities of the haptic glove 1500 may differ in different embodiments. Additionally, the various entities of the haptic glove 1500 may be positioned in different places on the glove body 1510. As one example, additional haptic apparatuses 1520 and the position sensors 1455 are located at different parts of the glove body 1510. As another example, the haptic apparatuses 220 are coupled to or wrap the entire fingers of the glove body 1510. As another example, the controller 1530 is coupled to a different portion of the glove body 1510 corresponding to, for example a wrist or a palm.

The glove body 1510 is an apparatus covering a hand, for example, a garment that is coupled to the position sensor 1455, the haptic apparatus 1520, the controller 1530, and the signaling path 1540. In one embodiment, the position sensor 1455 is coupled to a corresponding finger of the glove body 1510 (e.g., a portion corresponding to a fingertip of the glove body); the haptic apparatus 1520 is coupled to a corresponding finger portion (e.g., a portion corresponding to a joint between two phalanges) of the glove body 1510; and the controller 1530 is coupled to a portion of the glove body 1510 corresponding to a back of a hand (i.e., dorsal side). The signaling path 1540 is coupled between the controller 1530 and the haptic apparatus 1520. In one embodiment, one or more of these components are placed beneath an outer surface of the glove body 1510, thus are not visible from the outside. Additionally or alternatively, some of these components are placed on an outer surface of the glove body 1510, and are visually detectable.

In one embodiment, the haptic glove 1500 may be the haptic assembly 1405 shown in FIG. 14 and the locators 1450, the position sensor 1455 and the IMU 1460 of the haptic glove 1500 may be the corresponding locators 1450, position sensors 1455 and IMUs 1445 of the haptic assembly 1405 shown in FIG. 14. A user's hand movement can be detected and tracked according to fast calibration data from the IMU 1460 and/or slow calibration of the locators 1450 from the imaging device 1415. Moreover, haptic feedback including a perception of a user contacting a virtual object can be provided to the user by the controller 1530, signaling path 1540, and haptic apparatus 1520.

The haptic apparatus 1520 provides haptic feedback including a perception of a user touching a virtual object. In one embodiment, the haptic apparatus 1520 is actuated according to instructions received from the controller 1530. In one embodiment, the haptic apparatus 1520 is coupled to a portion corresponding to a joint between two phalanges of the glove body 1510. In another embodiment, the haptic apparatus 1520 covers the entire glove body 1510 or are placed on other parts (e.g., an area corresponding to a joint between two different fingers) of the glove body 1510. The haptic apparatus 1520 may be, for example, a plurality of actuators.

The controller 1530 is a device that provides instructions for the haptic apparatus 1520 to perform specific functions. The controller 1530 may receive instructions or haptic feedback from the console 1420 and actuates the haptic apparatus 1520 accordingly. The controller 1530 includes a plurality of fluidic devices, such as the fluidic devices depicted in FIGS. 3A-13B, which generate instructions for one or more haptic apparatuses (e.g., actuators). As discussed in detail above with regard to FIGS. 1, 2, and 14, fluidic devices are composable and may be coupled together to form composite fluidic devices, like, e.g., a decoder. Decoders, for example, can help reduce a number of logical connections within the controller 1530 and/or connections to the haptic apparatus 1520. Accordingly, the controller 1530 may be composed of a plurality of fluidic devices, including various combinations of those described above with regard to FIGS. 3A-13B.

ADDITIONAL CONFIGURATION INFORMATION

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A fluidic device comprising:
   a gate comprised of at least one chamber whose volume expands with fluid pressure within the chamber causing a volume of the chamber to increase, wherein a high pressure state of the gate corresponds to a first chamber size, and a low pressure state of the gate corresponds to a second chamber size that is smaller than the first chamber size;
   a channel configured to transport a fluid from a source to a drain, wherein the source is an input that fluid enters the channel, and the drain is an output for the fluid in the channel, wherein the output provides a signal to an actuator in a haptic apparatus; and
   an obstruction that controls a rate of fluid flow between the source and the drain in accordance with the fluid pressure within the gate, the obstruction configured to induce a first flow rate of the fluid in the channel in accordance with the low pressure state of the gate and a second flow rate of the fluid in the channel in accordance with the high pressure state of the gate;
   wherein the gate includes a plurality of inextensible elements that have a first shape at the low pressure state and a second shape at the high pressure state and a block that at least partially blocks the channel, and wherein the plurality of inextensible elements are attached to a curling actuator that is coupled to the block, and the curling actuator adjusts a location of the block within the channel based in part on the fluid pressure in the gate.

2. The fluidic device of claim 1, wherein the obstruction is the gate, and the first shape and second shape have cross sections of substantially equal area, and at the low pressure state the plurality of inextensible elements take on the first shape causing the gate to protrude into the channel to adjust fluid flow in the channel to the first flow rate, and at the high pressure state the plurality of inextensible elements take on the second shape causing the gate to protrude less into the channel to adjust fluid flow in the channel to the second flow rate, and wherein the first flow rate is less than the second flow rate.

3. The fluidic device of claim 1, wherein the channel comprises a flexible tube.

4. The fluidic device of claim 1, wherein the channel comprises a polymer material.

5. The fluidic device of claim 1, wherein a cross section of the channel is one of: circular, elliptical, square, or rectangular.

6. The fluidic device of claim 1, wherein an inner diameter of the channel is within the range of 50 μm to 5 mm.

7. The fluidic device of claim 1, wherein the inextensible elements are attached to a face of the curling actuator opposite the channel.

8. The fluidic device of claim 1, wherein the inextensible elements are biased to expand in a certain dimension.

9. The fluidic device of claim 8, wherein the inextensible elements are biased to expand in one direction and to shrink in a different direction.

10. The fluidic device of claim 1, wherein the curling actuator is configured such that when fluid pressure within the inextensible elements is increased, the curling actuator flexes and moves away from the channel.

11. A composite fluidic device comprising:
    a high pressure rail transporting fluid at a first pressure;
    a low pressure rail transporting fluid at a second pressure that is less than the first pressure; and
    a fluidic device coupled to the high pressure rail and the low pressure rail, the fluidic device comprising:
        a gate comprised of at least one chamber whose volume expands with fluid pressure within the chamber causing a volume of the chamber to increase, wherein a high pressure state of the gate corresponds to a first chamber size, and a low pressure state of the gate corresponds to a second chamber size that is smaller than the first chamber size;
        a channel configured to transport a fluid from a source to a drain, wherein the source is an input that fluid enters the channel, and the drain is an output for the fluid in the channel, wherein the output provides a signal to an actuator in a haptic apparatus; and
        an obstruction that controls a rate of fluid flow between the source and the drain in accordance with the fluid pressure within the gate, the obstruction configured to induce a first flow rate of the fluid in the channel in accordance with the low pressure state of the gate and a second flow rate of the fluid in the channel in accordance with the high pressure state of the gate;
        wherein the gate includes a plurality of inextensible elements that have a first shape at the low pressure state and a second shape at the high pressure state and a block that at least partially blocks the channel, and wherein the plurality of inextensible elements are attached to a curling actuator that is coupled to the block, and the curling actuator adjusts a location of the block within the channel based in part on the fluid pressure in the gate.

12. The composite fluidic device of claim 11, wherein the obstruction is the gate, and the first shape and second shape have cross sections of substantially equal area, and at the low pressure state the plurality of inextensible elements take on the first shape causing the gate to protrude into the channel to adjust fluid flow in the channel to the first flow rate, and at the high pressure state the plurality of inextensible elements take on the second shape causing the gate to protrude less into the channel to adjust fluid flow in the channel to the second flow rate, and wherein the first flow rate is less than the second flow rate.

13. The composite fluidic device of claim 11, wherein the fluid is a liquid.

14. The composite fluidic device of claim 11, wherein the low pressure rail is configured such that the second pressure of the fluid in the low pressure rail is between $1.45 \times 10^{-5}$ pound per square inch and 15 pounds per square inch.

15. The composite fluidic device of claim 11, wherein the high pressure rail is configured such that the first pressure of the fluid in the high pressure rail is between 1 pound per square inch and 100 pounds per square inch.

16. The composite fluidic device of claim 11, wherein each of the high pressure rail and the low pressure rail comprises a polymer.

17. The composite fluidic device of claim 11, wherein the inextensible elements are attached to a face of the curling actuator opposite the channel.

18. The composite fluidic device of claim 11, wherein the inextensible elements are biased to expand in a certain dimension.

19. The composite fluidic device of claim 11, wherein the inextensible elements are biased to expand in one direction and to shrink in a different direction.

20. The composite fluidic device of claim 11, wherein the curling actuator is configured such that when fluid pressure within the inextensible elements is increased, the curling actuator flexes and moves away from the channel.

* * * * *